(12) United States Patent
Noureldin et al.

(10) Patent No.: US 10,663,234 B2
(45) Date of Patent: May 26, 2020

(54) NATURAL GAS LIQUID FRACTIONATION PLANT WASTE HEAT CONVERSION TO SIMULTANEOUS COOLING CAPACITY AND POTABLE WATER USING KALINA CYCLE AND MODIFIED MULTI-EFFECT DISTILLATION SYSTEM

(71) Applicant: Saudi Arabian Oil Company, Dhahran (SA)

(72) Inventors: Mahmoud Bahy Mahmoud Noureldin, Dhahran (SA); Akram Hamed Mohamed Kamel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/842,522

(22) Filed: Dec. 14, 2017

(65) Prior Publication Data
US 2019/0049192 A1   Feb. 14, 2019

Related U.S. Application Data

(60) Provisional application No. 62/542,687, filed on Aug. 8, 2017.

(51) Int. Cl.
*F28D 21/00* (2006.01)
*B01D 1/00* (2006.01)
(Continued)

(52) U.S. Cl.
CPC ....... *F28D 21/0001* (2013.01); *B01D 1/0058* (2013.01); *B01D 1/0082* (2013.01);
(Continued)

(58) Field of Classification Search
CPC ......... B01D 53/002; C02F 1/16; F01K 27/02; F28D 21/00
See application file for complete search history.

(56) References Cited

U.S. PATENT DOCUMENTS

| 4,907,410 A | 3/1990 | Chang |
| 2,685,152 A | 11/1997 | Sterling |

(Continued)

FOREIGN PATENT DOCUMENTS

| WO | 2006039182 | 4/2006 |
| WO | 2012003525 | 1/2012 |

(Continued)

OTHER PUBLICATIONS

M. Mehrpooya et al., "Introducing a novel integrated NGL recovery process configuration (with a self-refrigeration system (open-closed cycle)) with minimum energy requirement," Chemical Engineering and Processing: Process Intensification, Apr. 2010, vol. 49, No. 4, pp. 376-388.

(Continued)

*Primary Examiner* — Brian A McCaig
(74) *Attorney, Agent, or Firm* — Fish & Richardson P.C.

(57) ABSTRACT

Certain implementations of natural gas liquid fractionation plant waste heat conversion to simultaneous cooling capacity and potable water using Kalina Cycle and modified multi-effect distillation system can be implemented as a system. The system includes first waste heat recovery heat exchanger configured to heat a first buffer fluid stream by exchange with a first heat source in a natural gas liquid fractionation plant. The system includes a water desalination system comprising a first train of one or more desalination heat exchangers configured to heat saline by exchange with the heated first buffer fluid stream to generate fresh water and brine.

59 Claims, 16 Drawing Sheets

(51) Int. Cl.

| | |
|---|---|
| *B01D 1/26* | (2006.01) |
| *B01D 3/06* | (2006.01) |
| *B01D 3/14* | (2006.01) |
| *C02F 1/04* | (2006.01) |
| *C02F 1/16* | (2006.01) |
| *C10G 5/06* | (2006.01) |
| *C10G 7/00* | (2006.01) |
| *F01K 27/02* | (2006.01) |
| *F25J 3/02* | (2006.01) |
| *B01D 53/00* | (2006.01) |
| *B01D 53/14* | (2006.01) |
| *B01D 53/26* | (2006.01) |
| *C02F 103/08* | (2006.01) |
| *F01K 25/10* | (2006.01) |

(52) U.S. Cl.
CPC ............... *B01D 1/26* (2013.01); *B01D 3/065* (2013.01); *B01D 3/146* (2013.01); *C02F 1/04* (2013.01); *C02F 1/16* (2013.01); *C10G 5/06* (2013.01); *C10G 7/00* (2013.01); *F01K 27/02* (2013.01); *F25J 3/0209* (2013.01); *F25J 3/0233* (2013.01); *F25J 3/0238* (2013.01); *F25J 3/0242* (2013.01); *B01D 53/002* (2013.01); *B01D 53/1456* (2013.01); *B01D 53/263* (2013.01); *C02F 2103/08* (2013.01); *F01K 25/10* (2013.01); *F25J 2200/02* (2013.01); *F25J 2200/70* (2013.01); *F25J 2200/74* (2013.01); *F25J 2215/62* (2013.01); *F25J 2240/70* (2013.01); *F25J 2260/02* (2013.01); *F25J 2270/12* (2013.01); *F25J 2270/60* (2013.01); *F28D 2021/0075* (2013.01)

(56) References Cited

U.S. PATENT DOCUMENTS

| | | | |
|---|---|---|---|
| 7,257,966 | B2 | 8/2007 | Lee et al. |
| 7,458,231 | B1 * | 12/2008 | Vanden Bussche ........................ B01D 9/0013 62/532 |
| 9,745,871 | B2 | 8/2017 | Noureldin et al. |
| 2006/0056015 | A1 | 3/2006 | Mccoy |
| 2008/0174115 | A1 | 7/2008 | Lambirth |
| 2008/0190135 | A1 | 8/2008 | Mak |
| 2010/0326131 | A1 | 12/2010 | Lengert |
| 2011/0000205 | A1 | 1/2011 | Hauer |
| 2013/0341929 | A1 | 12/2013 | Ho |
| 2014/0223911 | A1 | 8/2014 | Ikegami |
| 2015/0377079 | A1 | 12/2015 | Noureldin et al. |
| 2017/0058708 | A1 | 3/2017 | Noureldin et al. |
| 2017/0058711 | A1 | 3/2017 | Noureldin et al. |
| 2017/0058719 | A1 | 3/2017 | Noureldin et al. |
| 2017/0058721 | A1 | 3/2017 | Noureldin et al. |
| 2019/0048759 | A1 | 2/2019 | Noureldin et al. |

FOREIGN PATENT DOCUMENTS

| | | |
|---|---|---|
| WO | 2017035150 | 3/2017 |
| WO | 2017035166 | 3/2017 |

OTHER PUBLICATIONS

Rahimi et al., "A novel process for low grade heat driven desalination," Desalination, Oct. 15, 2014, vol. 351, pp. 202-212.
International Search Report and Written Opinion issued in International Application No. PCT/US2018/045554 dated Nov. 22, 2018, 21 pages.
International Search Report and Written Opinion issued in International Application No. PCT/US2018/045557 dated Nov. 22, 2018, 19 pages.
International Search Report and Written Opinion issued in International Application No. PCT/US2018/045550 dated Nov. 22, 2018, 18 pages.
International Search Report and Written Opinion issued in International Application No. PCT/US2018/045629 dated Nov. 22, 2018, 16 pages.
International Search Report and Written Opinion issued in International Application No. PCT/US2018/045531 dated Nov. 22, 2018, 20 pages.
International Search Report and Written Opinion issued in International Application No. PCT/US2018/045547 dated Nov. 22, 2018, 20 pages.
International Search Report and Written Opinion issued in International Application No. PCT/US2018/045640 dated Nov. 22, 2018, 19 pages.
International Search Report and Written Opinion issued in International Application No. PCT/US2018/045535 dated Nov. 22, 2018, 23 pages.
International Search Report and Written Opinion issued in International Application No. PCT/US2018/045558 dated Nov. 22, 2018, 22 pages.
International Search Report and Written Opinion issued in International Application No. PCT/US2018/045541 dated Nov. 22, 2018, 17 pages.
International Search Report and Written Opinion issued in International Application No. PCT/US2018/045537 dated Nov. 22, 2018, 16 pages.
International Search Report and Written Opinion issued in International Application No. PCT/US2018/045564 dated Nov. 22, 2018, 21 pages.
International Search Report and Written Opinion issued in International Application No. PCT/US2018/045622 dated Nov. 22, 2018, 18 pages.
Neill and Gunter, "Generation of Electric Power from Waste Heat in the Western Canadian Oil and Gas Industry Phase 1 Report-Scoping Evaluations Rev A," Petroleum Technology Alliance Canada (PTAC), Oct. 2007, 148 pages.
Bahnassi et al., "Achieving product specifications for ethane through to pentane plus from NGL fraction plants," AIChE Fall Conference, Jan. 1, 2005, 21 pages.
Rosenzweig, "Cryogenics for natural gas extraction/fractionation," Chemical engineering, access intelligence association, vol. 1, No. 77, Jan. 12, 1970, 3 pages.
Zhang et al., "Network modeling and design for low grade heat recovery, refrigeration, and utilization in Industrial parks," Industrial and Engineering Chemistry Research, vol. 55, No. 36, Sep. 14, 2016, 13 pages.
Kwak et al., "Integrated design and optimization of technologies for utilizing low grade heat in process industries," Applied Energy, vol. 131, Oct. 1, 2014, 16 pages.
Lira-Barragan et al., "Sustainable Integration of Trigeneration Systems with Head Exchanger Networks," Industrial & Engineering Chemistry Research, vol. 53, No. 7, Feb. 4, 2014, 19 pages.
Ammar et al., "Low grade thermal energy sources and uses from the process industry in the UK," Applied Energy, Elsevier Science Publishers, vol. 89, No. 1, Jun. 1, 2011, 18 pages.
Gaberiel et al., "Optimization across the water-energy nexus for integrating heat, power, and water for industrial processes, couples with the hybrid thermal-membrane dealination," Industrial and Engineering Chemistry Research, vol. 55, No. 12, Feb. 16, 2016, 25 pages.
Gonzalez-Bravo et al., "Optimal Design for Water Desalination Systems Involving Waste Heat Recovery," Industrial and Engineering Chemistry Research, vol. 56, No. 7, Feb. 8, 2017, 14 pages.
Ophir et al., "Advanced MED process for most economical sea water desalination," Desalination, Elsevier, Amsterdam, NL, vol. 182, No. 1-3, Nov. 1, 2005, 12 pages.
Gnaneswar Gude et al., "Feasibility study of a new two-stage low temperature desalination process," Energy Conversation and Management, Elsevier Science Publishers, vol. 56, Nov. 30, 2011, 7 pages.

(56) References Cited

OTHER PUBLICATIONS

Zhu et al., "Hybrid vapor compression refrigeration system with an integrated ejector cooling cycle," International Journal of Refrigeration, vol. 35, 2012, 11 pages.
Gulf Cooperation Council Examination Report issued in GCC Application No. GC 2018-35802 dated Dec. 30, 2019, 6 pages.
Gulf Cooperation Council Examination Report issued in GCC Application No. GC 2018-35793 dated Dec. 30, 2019, 5 pages.
Gulf Cooperation Council Examination Report issued in GCC Application No. GC 2018-35800 dated Dec. 30, 2019, 5 pages.

* cited by examiner

NATURAL GAS LIQUID FRACTIONATION PLANT WASTE HEAT CONVERSION TO SIMULTANEOUS COOLING CAPACITY AND POTABLE WATER USING KALINA CYCLE AND MODIFIED MULTI-EFFECT DISTILLATION SYSTEM

CROSS-REFERENCE TO RELATED APPLICATIONS

This disclosure claims the benefit of priority to U.S. Application Ser. No. 62/542,687 entitled "Utilizing Waste Heat Recovered From Natural Gas Liquid Fractionation Plants", which was filed on Aug. 8, 2017, the entire contents of which are incorporated herein by reference.

TECHNICAL FIELD

This disclosure relates to operating industrial facilities, for example, a natural gas liquid fractionation plant or other industrial facilities that include operating plants that generate heat, for example, a natural gas liquid fractionation plant.

BACKGROUND

Natural gas liquid (NGL) processes are chemical engineering processes and other facilities used in petroleum refineries to transform natural gas into products, for example, liquefied petroleum gas (LPG), gasoline, kerosene, jet fuel, diesel oils, fuel oils, and such products. NGL facilities are large industrial complexes that involve many different processing units and auxiliary facilities, for example, utility units, storage tanks, and such auxiliary facilities. Each refinery can have its own unique arrangement and combination of refining processes determined, for example, by the refinery location, desired products, economic considerations, or such factors. The NGL processes that are implemented to transform the natural gas into the products such as those listed earlier can generate heat, which may not be reused, and byproducts, for example, greenhouse gases (GHG), which may pollute the atmosphere. It is believed that the world's environment has been negatively affected by global warming caused, in part, due to the release of GHG into the atmosphere.

SUMMARY

This specification describes technologies relating to cooling capacity generation, power generation or potable water production from waste heat in a natural gas liquid (NGL) fractionation plant.

The present disclosure includes one or more of the following units of measure with their corresponding abbreviations, as shown in Table 1:

TABLE 1

| Unit of Measure | Abbreviation |
| --- | --- |
| Degrees Celsius | ° C. |
| Megawatts | MW |
| One million | MM |
| British thermal unit | Btu |
| Hour | h |
| Pounds per square inch (pressure) | psi |
| Kilogram (mass) | Kg |
| Second | S |

TABLE 1-continued

| Unit of Measure | Abbreviation |
| --- | --- |
| Cubic meters per day | m$^3$/day |
| Fahrenheit | F. |

An example implementation includes a system. The system includes first waste heat recovery heat exchanger configured to heat a first buffer fluid stream by exchange with a first heat source in a natural gas liquid fractionation plant. The system includes a water desalination system comprising a first train of one or more desalination heat exchangers configured to heat saline by exchange with the heated first buffer fluid stream to generate fresh water and brine.

This, and other aspects, can include one or more of the following features. In another aspect combinable with any of the previous aspects, the water desalination system is configured to generate between 50,000 m$^3$/day and 70,000 m$^3$/day of fresh water. In another aspect combinable with any of the previous aspects, the first train of the water desalination system includes a first desalination heat exchanger configured to heat saline by exchange with the heated first buffer fluid stream to generate water vapor and brine, and a second desalination heat exchanger configured to heat saline by exchange with the water vapor from the first desalination heat exchanger to generate water vapor and brine. In another aspect combinable with any of the previous aspects, the water vapor from the first desalination heat exchanger is condensed into fresh water in the second desalination heat exchanger. In another aspect combinable with any of the previous aspects, the first buffer fluid stream enters the first train at a temperature of between 60° C. and 70° C. and exits the first train at a temperature of between 55° C. and 65° C. In another aspect combinable with any of the previous aspects, the water desalination system comprises a second train of one or more desalination heat exchangers configured to heat saline by exchange with a combined buffer fluid stream to generate fresh water and brine. In another aspect combinable with any of the previous aspects, the combined buffer fluid stream includes the first buffer fluid stream from the first train and a heated second buffer fluid stream heated by exchange with a second heat source in the natural gas liquid fractionation plant. In another aspect combinable with any of the previous aspects, the combined buffer fluid stream enters the second train at a temperature of between 55° C. and 65° C. and exits the second train at a temperature of between 50° C. and 60° C. In another aspect combinable with any of the previous aspects, the water desalination system comprises a third train of one or more desalination heat exchangers configured to heat saline by exchange with the combined buffer fluid stream from the second train. In another aspect combinable with any of the previous aspects, the combined buffer fluid stream enters the third train at a temperature of between 50° C. and 60° C. and exits the third train at a temperature of between 45° C. and 55° C. In another aspect combinable with any of the previous aspects, the first waste heat recovery heat exchanger is configured to heat the first buffer fluid stream by exchange with propane gas output from a depropanizer in the natural gas liquid fractionation plant. In another aspect combinable with any of the previous aspects, the first waste heat recovery heat exchanger is configured to heat the first buffer fluid stream by exchange with butane gas output from a debutanizer in the natural gas liquid fractionation plant. In another aspect combinable with any of the previous aspects, the system includes a second waste heat recovery heat exchanger configured to heat a second buffer fluid stream by exchange with a second heat source in the natural gas liquid fractionation plant. In another aspect combinable with any of the previous aspects, the system includes a Kalina cycle energy conversion system including one or more first energy conversion heat exchangers configured to heat a working fluid by exchange with the heated second buffer fluid stream, a separator configured to receive the heated working fluid and to output a vapor stream of the working fluid and a liquid stream of the working fluid, a cooling subsystem including a first cooling element configured to condense the vapor stream of the working fluid and a second cooling element configured to cool a process fluid stream from the natural gas liquid fractionation plant by exchange with the condensed vapor stream of the working fluid. In another aspect combinable with any of the previous aspects, the cooling subsystem is configured to produce at least 350 MM Btu/h of cooling capacity for the natural gas liquid fractionation plant. In another aspect combinable with any of the previous aspects, the second cooling element comprises a chiller having a thermal duty of between 300 MM Btu/h and 500 MM Btu/h. In another aspect combinable with any of the previous aspects, the first cooling element comprises a cooler having a thermal duty of between 400 Btu/h and 600 Btu/h. In another aspect combinable with any of the previous aspects, the first cooling element comprises a valve. In another aspect combinable with any of the previous aspects, the valve is configured to condense the working fluid to a pressure of between 4 Bar and 5 Bar and a temperature of between 30° F. and 50° F. In another aspect combinable with any of the previous aspects, the energy conversion system comprises a pump configured to pump the working fluid to a pressure of between 11 Bar and 12 Bar. In another aspect combinable with any of the previous aspects, the one or more first energy conversion heat exchangers include an energy conversion heat exchanger having a thermal duty of between 100 MM Btu/h and 200 MM Btu/h, and an energy conversion heat exchanger having a thermal duty of between 400 MM Btu/h and about 500 MM Btu/h. In another aspect combinable with any of the previous aspects, the one or more first energy conversion heat exchangers are configured to heat the first portion of the working fluid to a temperature of between 160° F. and 180° F. In another aspect combinable with any of the previous aspects, the one or more first energy conversion heat exchangers are configured to heat a first portion of the working fluid. In another aspect combinable with any of the previous aspects, the Kalina cycle energy conversion system includes one or more second energy conversion heat exchangers configured to heat a second portion of the working fluid, the second by exchange with the liquid stream of the working fluid. In another aspect combinable with any of the previous aspects, the separator is configured to receive the heated first and second portions of the working fluid. In another aspect combinable with any of the previous aspects, the one or more second energy conversion heat exchangers are configured to heat the second portion of the working fluid by exchange with the heated second buffer fluid stream. In another aspect combinable with any of the previous aspects, the one or more second energy conversion heat exchangers include a heat exchanger having a thermal duty of between 150 MM Btu/h and 250 MM Btu/h and a heat exchanger having a thermal duty of between 300 MM Btu/h and about 400 MM Btu/h. In another aspect combinable with any of the previous aspects, the one or more second energy conversion heat exchangers are configured to heat the second portion of the working fluid to a temperature of between 160° F. and 180° F. In another aspect combinable with any of the previous aspects, the system includes a turbine configured to generate power from the liquid stream of the working fluid. In another aspect combinable with any of the previous aspects, the system includes a storage tank. In another aspect combinable with any of the previous aspects, the first buffer fluid stream flows from the storage tank, through the first waste heat recovery heat exchanger, through the water desalination system, and back to the storage tank. In another aspect combinable with any of the previous aspects, the second buffer fluid stream flows from the storage tank, through the second waste heat recovery heat exchanger, through the Kalina cycle energy conversion system, and back to the storage tank. In another aspect combinable with any of the previous aspects, the second waste heat recovery heat exchanger is configured to heat the second buffer fluid stream by exchange with propane gas output from a propane dehydrator in the natural gas liquid fractionation plant. In another aspect combinable with any of the previous aspects, the second waste heat recovery heat exchanger is configured to heat the second buffer fluid stream by exchange with a C5+ bottoms product from a debutanizer in the natural gas liquid fractionation plant. In another aspect combinable with any of the previous aspects, the second waste heat recovery heat exchanger is configured to heat the second buffer fluid stream by exchange with butane gas output from a butane dehydrator in the natural gas liquid fractionation plant. In another aspect combinable with any of the previous aspects, the second waste heat recovery heat exchanger is configured to heat the second buffer fluid stream by exchange with pentane gas output from a depentanizer in the natural gas liquid fractionation plant. In another aspect combinable with any of the previous aspects, the second waste heat recovery exchanger is configured to heat the second buffer fluid stream by exchange with acid gases output from an ADIP generator in the natural gas liquid fractionation plant. In another aspect combinable with any of the previous aspects, the second waste heat recovery exchanger is configured to heat the second buffer fluid stream by exchange with lean ADIP output from an ADIP generator in the natural gas liquid fractionation plant. In another aspect combinable with any of the previous aspects, the second waste heat recovery exchanger is configured to heat the second buffer fluid stream by exchange with light NG components output from a pre-flash drum in a decolorizing section of the natural gas liquid fractionation plant. In another aspect combinable with any of the previous aspects, the second waste heat recovery exchanger is configured to heat the second buffer fluid stream by exchange with NG gas output from a decolorizer in the natural gas liquid fractionation plant. In another aspect combinable with any of the previous aspects, the second waste heat recovery exchanger is configured to heat the second buffer fluid stream by exchange with compressed propane in the natural gas liquid fractionation plant. In another aspect combinable with any of the previous aspects, the second waste heat recovery exchanger is configured to heat the second buffer fluid stream by exchange with dry ethane gas in the natural gas liquid fractionation plant. In another aspect combinable with any of the previous aspects, the second waste heat recovery exchanger is configured to heat the second buffer fluid stream by exchange with pentane gas output from an RVP column in the natural gas liquid fractionation plant.

An example implementation includes a method. A first buffer fluid stream is heated via a first waste heat recovery heat exchanger by exchange with a first heat source in a natural gas liquid fractionation plant. Fresh water is generated in a first train of a water desalination system, including heating saline in one or more desalination heat exchangers of the first train by exchange with the heated first buffer fluid stream to generate fresh water and brine.

This, and other aspects, can include one or more of the following features. In another aspect combinable with any of the previous aspects, the water desalination system is configured to generate between 50,000 m³/day and 70,000 m³/day of fresh water. In another aspect combinable with any of the previous aspects, the first train of the water desalination system includes a first desalination heat exchanger configured to heat saline by exchange with the heated first buffer fluid stream to generate water vapor and brine, and a second desalination heat exchanger configured to heat saline by exchange with the water vapor from the first desalination heat exchanger to generate water vapor and brine. In another aspect combinable with any of the previous aspects, the water vapor from the first desalination heat exchanger is condensed into fresh water in the second desalination heat exchanger. In another aspect combinable with any of the previous aspects, the first buffer fluid stream enters the first train at a temperature of between 60° C. and 70° C. and exits the first train at a temperature of between 55° C. and 65° C. In another aspect combinable with any of the previous aspects, the water desalination system comprises a second train of one or more desalination heat exchangers configured to heat saline by exchange with a combined buffer fluid stream to generate fresh water and brine. In another aspect combinable with any of the previous aspects, the combined buffer fluid stream includes the first buffer fluid stream from the first train and a heated second buffer fluid stream heated by exchange with a second heat source in the natural gas liquid fractionation plant. In another aspect combinable with any of the previous aspects, the combined buffer fluid stream enters the second train at a temperature of between 55° C. and 65° C. and exits the second train at a temperature of between 50° C. and 60° C. In another aspect combinable with any of the previous aspects, the water desalination system comprises a third train of one or more desalination heat exchangers configured to heat saline by exchange with the combined buffer fluid stream from the second train. In another aspect combinable with any of the previous aspects, the combined buffer fluid stream enters the third train at a temperature of between 50° C. and 60° C. and exits the third train at a temperature of between 45° C. and 55° C. In another aspect combinable with any of the previous aspects, the first waste heat recovery heat exchanger is configured to heat the first buffer fluid stream by exchange with propane gas output from a depropanizer in the natural gas liquid fractionation plant. In another aspect combinable with any of the previous aspects, the first waste heat recovery heat exchanger is configured to heat the first buffer fluid stream by exchange with butane gas output from a debutanizer in the natural gas liquid fractionation plant. In another aspect combinable with any of the previous aspects, the system includes a second waste heat recovery heat exchanger configured to heat a second buffer fluid stream by exchange with a second heat source in the natural gas liquid fractionation plant. In another aspect combinable with any of the previous aspects, the system includes a Kalina cycle energy conversion system including one or more first energy conversion heat exchangers configured to heat a working fluid by exchange with the heated second buffer fluid stream, a separator configured to receive the heated working fluid and to output a vapor stream of the working fluid and a liquid stream of the working fluid, a cooling subsystem including a first cooling element configured to condense the vapor stream of the working fluid and a second cooling element configured to cool a process fluid stream from the natural gas liquid fractionation plant by exchange with the condensed vapor stream of the working fluid. In another aspect combinable with any of the previous aspects, the cooling subsystem is configured to produce at least 350 MM Btu/h of cooling capacity for the natural gas liquid fractionation plant. In another aspect combinable with any of the previous aspects, the second cooling element comprises a chiller having a thermal duty of between 300 MM Btu/h and 500 MM Btu/h. In another aspect combinable with any of the previous aspects, the first cooling element comprises a cooler having a thermal duty of between 400 Btu/h and 600 Btu/h. In another aspect combinable with any of the previous aspects, the first cooling element comprises a valve. In another aspect combinable with any of the previous aspects, the valve is configured to condense the working fluid to a pressure of between 4 Bar and 5 Bar and a temperature of between 30° F. and 50° F. In another aspect combinable with any of the previous aspects, the energy conversion system comprises a pump configured to pump the working fluid to a pressure of between 11 Bar and 12 Bar. In another aspect combinable with any of the previous aspects, the one or more first energy conversion heat exchangers include an energy conversion heat exchanger having a thermal duty of between 100 MM Btu/h and 200 MM Btu/h, and an energy conversion heat exchanger having a thermal duty of between 400 MM Btu/h and about 500 MM Btu/h. In another aspect combinable with any of the previous aspects, the one or more first energy conversion heat exchangers are configured to heat the first portion of the working fluid to a temperature of between 160° F. and 180° F. In another aspect combinable with any of the previous aspects, the one or more first energy conversion heat exchangers are configured to heat a first portion of the working fluid. In another aspect combinable with any of the previous aspects, the Kalina cycle energy conversion system includes one or more second energy conversion heat exchangers configured to heat a second portion of the working fluid, the second by exchange with the liquid stream of the working fluid. In another aspect combinable with any of the previous aspects, the separator is configured to receive the heated first and second portions of the working fluid. In another aspect combinable with any of the previous aspects, the one or more second energy conversion heat exchangers are configured to heat the second portion of the working fluid by exchange with the heated second buffer fluid stream. In another aspect combinable with any of the previous aspects, the one or more second energy conversion heat exchangers include a heat exchanger having a thermal duty of between 150 MM Btu/h and 250 MM Btu/h and a heat exchanger having a thermal duty of between 300 MM Btu/h and about 400 MM Btu/h. In another aspect combinable with any of the previous aspects, the one or more second energy conversion heat exchangers are configured to heat the second portion of the working fluid to a temperature of between 160° F. and 180° F. In another aspect combinable with any of the previous aspects, the system includes a turbine configured to generate power from the liquid stream of the working fluid. In another aspect combinable with any of the previous aspects, the system includes a storage tank. In another aspect combinable with any of the previous aspects, the first buffer fluid stream flows from the storage tank, through the first waste heat recovery heat exchanger, through the water desalination system, and back to the storage tank. In another aspect combinable with any of the previous aspects, the second buffer fluid stream flows from the storage tank, through the second waste heat recovery heat exchanger, through the Kalina cycle energy conversion system, and back to the storage tank. In another aspect combinable with any of the previous aspects, the second waste heat recovery heat exchanger is configured to heat the second buffer fluid stream by exchange with propane gas output from a propane dehydrator in the natural gas liquid fractionation plant. In another aspect combinable with any of the previous aspects, the second waste heat recovery heat exchanger is configured to heat the second buffer fluid stream by exchange with a C5+ bottoms product from a debutanizer in the natural gas liquid fractionation plant. In another aspect combinable with any of the previous aspects, the second waste heat recovery heat exchanger is configured to heat the second buffer fluid stream by exchange with butane gas output from a butane dehydrator in the natural gas liquid fractionation plant. In another aspect combinable with any of the previous aspects, the second waste heat recovery heat exchanger is configured to heat the second buffer fluid stream by exchange with pentane gas output from a depentanizer in the natural gas liquid fractionation plant. In another aspect combinable with any of the previous aspects, the second waste heat recovery exchanger is configured to heat the second buffer fluid stream by exchange with acid gases output from an ADIP generator in the natural gas liquid fractionation plant. In another aspect combinable with any of the previous aspects, the second waste heat recovery exchanger is configured to heat the second buffer fluid stream by exchange with lean ADIP output from an ADIP generator in the natural gas liquid fractionation plant. In another aspect combinable with any of the previous aspects, the second waste heat recovery exchanger is configured to heat the second buffer fluid stream by exchange with light NG components output from a pre-flash drum in a decolorizing section of the natural gas liquid fractionation plant. In another aspect combinable with any of the previous aspects, the second waste heat recovery exchanger is configured to heat the second buffer fluid stream by exchange with NG gas output from a decolorizer in the natural gas liquid fractionation plant. In another aspect combinable with any of the previous aspects, the second waste heat recovery exchanger is configured to heat the second buffer fluid stream by exchange with compressed propane in the natural gas liquid fractionation plant. In another aspect combinable with any of the previous aspects, the second waste heat recovery exchanger is configured to heat the second buffer fluid stream by exchange with dry ethane gas in the natural gas liquid fractionation plant. In another aspect combinable with any of the previous aspects, the second waste heat recovery exchanger is configured to heat the second buffer fluid stream by exchange with pentane gas output from an RVP column in the natural gas liquid fractionation plant.

The details of one or more implementations of the subject matter described in this specification are set forth in the accompanying drawings and the detailed description. Other features, aspects, and advantages of the subject matter will become apparent from the description, the drawings, and the claims.

DETAILED DESCRIPTION

NGL Plant

Figure 1A:
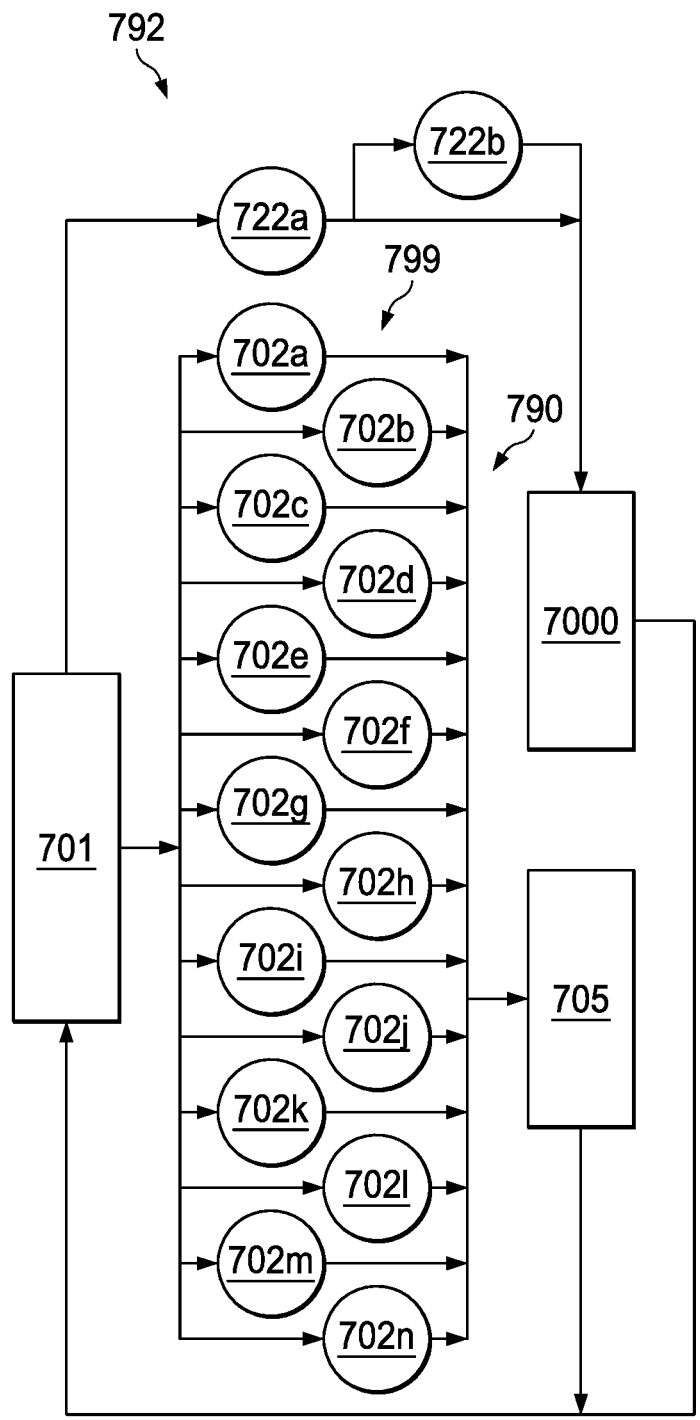
FIG. 1A is a diagram of a low grade waste heat recovery system.

Gas processing plants can purify raw natural gas or crude oil production associated gases (or both) by removing common contaminants such as water, carbon dioxide and hydrogen sulfide. Some of the substances which contaminate natural gas have economic value and can be processed or sold or both. Upon the separation of methane gas, which is useful as sales gas for houses and power generation, the remaining hydrocarbon mixture in liquid phase is called natural gas liquids (NGL). The NGL is fractionated in a separate plant or sometimes in the same gas processing plant into ethane, propane and heavier hydrocarbons for several versatile uses in chemical and petrochemical as well as transportation industries. The NGL fractionation plant uses the following processes or sections: fractionation, product treating, and natural gasoline processing. The fractionation processes or sections can include heat sources (also commonly referred to as streams) including, but not limited to, a propane condenser, a propane refrigerant condenser, a naphtha cooler, a de-pentanizer condenser, an amine-di-isopropanol (ADIP) cooler, a regenerator overhead (OVHD) condenser, a Reid vapor pressure (RVP) column condenser, a de-propanizer condenser, a de-butanizer condenser, or combinations thereof. The product treating processes or sections can include the following non-limiting heat sources: a propane dehydrator condenser, a butane dehydrator condenser, a propane condenser, an air-cooled condenser, a regeneration gas cooler, and a butane condenser, or combinations thereof. The natural gasoline processing processes or sections can include, but are not limited to, a natural gasoline (NG) flash vapor condenser, a NG de-colorizer condenser, or combinations thereof.

Fractionation Section

Fractionation is the process of separating the different components of natural gas. Separation is possible because each component has a different boiling point. At temperatures less than the boiling point of a particular component, that component condenses to a liquid. It is also possible to increase the boiling point of a component by increasing the pressure. By using columns operating at different pressures and temperatures, the NGL fractionation plant is capable of separating ethane, propane, butane, pentane, or combinations thereof (with or without heavier associated hydrocarbons) from NGL fractionation feeds. De-ethanizing separates ethane from C2+ NGL, where C2 refers to a molecule containing two carbon atoms (ethane), and where C2+ refers to a mixture containing molecules having two or more carbon atoms, for example, a NGL containing C2, C3, C4, C5 can be abbreviated as "C2+ NGL". De-propanizing and de-butanizing separate propane and butane, respectively, from C3+ NGL and C4+ NGL, respectively. Because the boiling points of heavier natural gases are closer to each other, such gases can be harder to separate compared to lighter natural gases. Also, a rate of separation of heavier components is less than that of comparatively lighter components. In some instances, the NGL fractionation plant can implement, for example, about 45 distillation trays in the de-ethanizer, about 50 trays in the de-propanizer, and about 55 trays in the de-butanizer.

The fractionation section can receive a feed gas containing C2+ NGL from gas plants, which are upstream plants that condition and sweeten the feed gas, and produce a sales gas, such as a C1/C2 mixture, where C1 is about 90%, as a final product. The C2+ NGL from gas plants can be further processed in the NGL fractionation plant for C2+ recovery. From feed metering or surge unit metering (or both), feed flows to the three fractionation modules, namely, the de-ethanizing module, the de-propanizing module and the de-butanizing module, each of which is described later.

De-ethanizer Module (or De-ethanizer Column)

The C2+ NGL is pre-heated before entering the de-ethanizer column for fractionation. The separated ethane leaves the column as overhead gas. The ethane gas is condensed by a closed-loop propane refrigeration system. After being cooled and condensed, the ethane is a mixture of gas and liquid. The liquid ethane is separated and pumped back to the top of the column as reflux. The ethane gas is warmed in an economizer and then sent to users. The bottoms product from the de-ethanizer reboiler is C3+ NGL, which is sent to the de-propanizer module.

De-propanizer Module (or De-propanizer Column)

From the de-ethanizer module, C3+ NGL enters the de-propanizer module for fractionation. The separated propane leaves the column as overhead gas. The gas is condensed using coolers. The propane condensate is collected in a reflux drum. Some of the liquid propane is pumped back to the column as reflux. The rest of the propane is either treated or sent to users as untreated product. The bottoms product from the depropanizer reboiler, C4+ is then sent to the de-butanizer module De-butanizer Module (or De-butanizer Column)

C4+ enters the de-butanizer module for fractionation. The separated butane leaves the column as overhead gas. The gas is condensed using coolers. The butane condensate is collected in a reflux drum. Some of the liquid butane is pumped back to the column as reflux. The rest of the butane is either treated or sent to users as untreated product. The bottoms product from the debutanizer reboiler, C5+ natural gas (NG) goes on to a RVP control section (which may also be referred to as a rerun unit), which will be discussed in greater detail in a later section.

Product Treating Section

While ethane requires no further treatment, propane and butane products are normally treated to remove hydrogen sulfide ($H_2S$), carbonyl sulfide (COS), and mercaptan sulfur (RSH). Then, the products are dried to remove any water. All exported product is treated, while untreated products can go to other industries. As described later, propane receives ADIP treating, MEROX™ (Honeywell UOP; Des Plaines, Ill.) treating, and dehydration. Butane receives MEROX treating, and dehydration.

ADIP Treating Section

ADIP is a solution of di-isopropanol amine and water. ADIP treating extracts $H_2S$ and COS from propane. The ADIP solution, through contact with the sour propane, absorbs the $H_2S$ and COS. The ADIP solution first contacts the sour propane in an extractor. In the extractor, the ADIP absorbs most of the $H_2S$ and some of the COS. The propane then passes through a mixer/settler train where the propane contacts with ADIP solution to extract more $H_2S$ and COS. This partially sweetened propane is cooled and then washed with water to recover the ADIP entrained with the propane. The propane is then sent to MEROX treating, which is described later. The rich ADIP that has absorbed the $H_2S$ and COS leaves the bottom of the extractor and is regenerated into lean ADIP for reuse. The regenerator column has a temperature and pressure that are suitable for acid gas removal. When the rich ADIP enters the regenerator, the entrained acid gases are stripped. As the acid gases leaves the regenerator as overhead, any free water is removed to prevent acid formation. The acid gases are then sent to flare. The lean ADIP leaves the extractor bottom and is cooled and filtered. Lean ADIP returns to the last mixer/settler and flows back through the system in the counter-current direction of the propane to improve contact between the propane and ADIP, which improves $H_2S$ and COS extraction.

C3/C4 MEROX Treating Section

MEROX treating removes mercaptan sulfur from C3/C4 product. Mercaptans are removed using a solution of sodium hydroxide (NaOH), also known by the commercial name caustic soda (hereinafter referred to as "caustic") and MEROX. The MEROX catalyst facilitates the oxidation of mercaptans to disulfides. The oxidation takes place in an alkaline environment, which is provided by using the caustic solution. MEROX treating for C3 and C4 is similar. Both products are prewashed with caustic to remove any remaining traces of $H_2S$, COS, and $CO_2$. This prevents damage to the caustic that is used in MEROX treating. After prewashing, product flows to an extractor, where a caustic solution with MEROX catalyst contacts with the product. The caustic/catalyst solution converts the mercaptans into mercaptides. The sweetened product, which is lean on acid gases, leaves the extractor as overhead and any remaining caustic is separated. Caustic leaves the bottom of both product extractors rich with mercaptides. The rich caustic is regenerated into lean caustic for reuse. The C3/C4 extraction sections share a common caustic regeneration section, namely, an oxidizer. Before entering the bottom of the oxidizer, the rich caustic is injected with MEROX catalyst to maintain proper catalyst concentration, heated, and mixed with process air. In the oxidizer, the mercaptides are oxidized into disulfides. The mixture of disulfides, caustic, and air leave the oxidizer as overhead. The air, disulfide gases, and disulfide oil are separated from the regenerated caustic. The regenerated caustic is pumped to the C3/C4 extractor. Regenerated caustic with any residual disulfides is washed with NG in the NG wash settler.

C3/C4 Dehydration Section

Propane or butane products (or both) contain water when they leave MEROX treating. Dehydration removes moisture in such products through adsorption before the products flow to refrigeration and storage. The dehydration processes for C3 and C4 are similar. Both C3/C4 dehydration sections have two de-hydrators containing molecular sieve desiccant beds. One de-hydrator is in service while the other undergoes regeneration. Regeneration consists of heating the sieve beds to remove moisture, then cooling the beds before reuse. During drying, product flows up and through the molecular sieve bed, which adsorbs (that is, binds to its surface) moisture. From the top of the de-hydrator, dry C3/C4 products flow to refrigeration.

Natural Gasoline (NG) Processing Section

NG processing includes RVP control, de-colorizing and de-pentanizing sections.

RVP Control Section

A Reid vapor pressure (RVP) control section (or rerun unit) is a fractionator column that receives the C5+ NG from the debutanizer bottom. The RVP control section collects a pentane product. The RVP control section can be used to adjust the RVP of the pentane product at a rerun fractionator overhead before the pentane product is sent to a pentane storage tank. RVP is a measure of the ability of a hydrocarbon to vaporize. RVP (sometimes called volatility) is an important specification in gasoline blending. The RVP control section stabilizes the RVP of NG by removing small amounts of pentane. Depending on operational requirements, the RVP control section can be totally or partially bypassed. NG from the debutanizer bottoms goes to the RVP column where a controlled amount of pentane is stripped and leaves the column as overhead gas. As in NGL fractionation, the overhead gas is condensed with coolers, and some of the condensate is pumped back to the column as reflux. The remaining pentane is cooled and sent to storage. If the RVP column bottoms product (NG) meets color specifications, it is sent to storage. If not, it is sent to decolorizing.

De-colorizing Section

The de-colorizing section removes color bodies from NG. Color bodies are traces of heavy ends found in the debutanizer bottoms product. Other impurities such as corrosion products from the pipeline may also be present. These must be removed for NG to meet the color specification. De-colorizer feed can be RVP column bottoms product or de-butanizer bottoms product, or a combination of both. Additional natural gasoline can also be supplied from other facilities to maintain a hexane plus (C6+) product supply. If de-colorizing is needed, NG first passes through a pre-flashdrum. A large portion of the lighter NG components vaporizes and leaves the drum as overhead. The heavier NG components remain along with the color bodies and are fed to the de-colorizer column, where the remaining color bodies are separated. The NG leaves the de-colorizer as overhead gas and is condensed and collected in the NG product drum, with some pumped back to the column as reflux. Overhead from the column and flash drum are joined and pumped to either the de-pentanizer (described later) or cooled and sent to storage in the feed product surge unit. The color bodies leave the de-colorizer as bottoms product and are pumped to the feed and surge unit to be injected into a crude line.

De-pentanizing Section

De-pentanizing uses a fractionation column to produce a pentane overhead product and a C6+ bottoms product. Both the pentane product and the C6+ bottoms product are separately fed to storage or downstream the petrochemical plants. The feed to the de-pentanizer is the NG product stream from the de-colorizing section. Feed can be increased or decreased based on the demand for C6+ bottoms product. If the NGL fractionation plant NG production cannot meet demand, NG can be imported from oil refineries. The de-colorized NG is preheated before entering the de-pentanizer. The separated pentane leaves the column as overhead gas. The overhead condensers cool the overhead stream, and some is pumped back to the column as reflux. The remaining pentane is cooled and sent to storage. Light NG in the bottoms is vaporized and returned to heat the de-pentanizer. The remaining bottoms product is cooled and sent to storage as C6+.

Table 2 lists duty per train of major waste heat streams in an example of an NGL fractionation plant.

TABLE 2

| Stream Name | Duty/train (MMBtu/h) |
| --- | --- |
| Propane refrigerant condenser | 94 |
| Propane de-hydration condenser | 22 |
| Butane de-hydrator condenser | 9 |
| Naphtha cooler | 11 |
| De-pentanizer condenser | 100 |
| ADIP cooler | 73 |
| Regenerator OVHD condenser | 18 |
| NG flash vapor condenser | 107 |
| NG de-colorizer condenser | 53 |
| Natural gasoline (cooling) process propane condenser | 29 |
| Fractionation propane condenser | 81 |
| Air cooled condenser | 16 |
| Regeneration gas cooler | 22 |
| RVP column condenser | 36 |
| Butane condenser | 49 |
| De-propanizer condenser | 194 |
| De-butanizer condenser | 115 |

In Table 2, "Duty/train" represents each stream's thermal duty in millions Btu per hour (MMBtu/h) per processing train. A typical NGL fractionation plant includes three to four processing trains.

The systems described in this disclosure can be integrated with a NGL fractionation plant to make the fractionation plant more energy efficient or less polluting or both. In particular, the energy conversion system can be implemented to recover low grade waste heat from the NGL fractionation plant. Low grade waste heat is characterized by a temperature difference between a source and sink of the low grade heat steam being between 65° C. and 232° C. (150° F. and 450° F.). The NGL fractionation plant is an attractive option for integration with energy conversion systems due to a large amount of low grade waste heat generated by the plant and an absence of a need for deep cooling. Deep cooling refers to a temperature that is less than ambient that uses a refrigeration cycle to maintain.

The low grade waste heat from an NGL fractionation plant can be used for commodities such as carbon-free power generation, cooling capacity generation, potable water production from sea water, or combinations thereof. Low grade waste heat is characterized by a temperature ranging between 65° C. and 232° C. (150° F. to 450° F.). The waste heat can be used for the mono-generation, co-generation, or tri-generation of one or more or all of the commodities mentioned earlier. Low grade waste heat from the NGL fractionation plant can be used to provide in-plant sub-ambient cooling, thus reducing the consumption of power or fuel (or both) of the plant. Low grade waste heat from the NGL fractionation plant can be used to provide ambient air conditioning or cooling in the industrial community or in a nearby non-industrial community, thus helping the community to consume energy from alternative sources. In addition, the low grade waste heat can be used to desalinate water and produce potable water to the plant and adjacent community. An NGL fractionation plant is selected for low grade waste heat recovery because of a quantity of low grade waste heat available from the NGL fractionation plant as well as a cooling requirement of the plant to ambient temperature cooling (instead of deep cooling).

The energy conversion systems described in this disclosure can be integrated into an existing NGL fractionation plant as a retrofit or can be part of a newly constructed NGL fractionation plant. A retrofit to an existing NGL fractionation plant allows the carbon-free power generation, and fuel savings advantages offered by the energy conversion systems described here to be accessible with a reduced capital investment. For example, the energy conversion systems described here can produce one or more or all of substantially between 35 MW and 40 MW (for example, 37 MW) of carbon-free power, substantially between 100,000 and 150,000 m$^3$/day (for example, 120,000 m$^3$/day) of desalinated water, and substantially between 350 MM BTU/h and 400 MM BTU/h (for example, 388 MM BTU/h) of cooling capacity for in-plant or community utilization or both.

As described later, the systems for waste heat recovery and re-use from the NGL fractionation plant can include modified multi-effect distillation (MED) systems, customized Organic Rankine Cycle (ORC) systems, unique ammonia-water mixture Kalina cycle systems, customized modified Goswami cycle systems, mono-refrigerant specific vapor compression-ejector-expander triple cycle systems, or combinations of one or more of them. Details of each disclosure are described in the following paragraphs.

Heat Exchangers

In the configurations described in this disclosure, heat exchangers are used to transfer heat from one medium (for example, a stream flowing through a plant in a NGL fractionation plant, a buffer fluid or such medium) to another medium (for example, a buffer fluid or different stream flowing through a plant in the NGL fractionation plant). Heat exchangers are devices which transfer (exchange) heat typically from a hotter fluid stream to a relatively less hotter fluid stream. Heat exchangers can be used in heating and cooling applications, for example, in refrigerators, air conditions or such cooling applications. Heat exchangers can be distinguished from one another based on the direction in which fluids flow. For example, heat exchangers can be parallel-flow, cross-flow or counter-current. In parallel-flow heat exchangers, both fluid involved move in the same direction, entering and exiting the heat exchanger side-by-side. In cross-flow heat exchangers, the fluid path runs perpendicular to one another. In counter-current heat exchangers, the fluid paths flow in opposite directions, with one fluid exiting whether the other fluid enters. Counter-current heat exchangers are sometimes more effective than the other types of heat exchangers.

In addition to classifying heat exchangers based on fluid direction, heat exchangers can also be classified based on their construction. Some heat exchangers are constructed of multiple tubes. Some heat exchangers include plates with room for fluid to flow in between. Some heat exchangers enable heat exchange from liquid to liquid, while some heat exchangers enable heat exchange using other media.

Heat exchangers in a NGL fractionation plant are often shell and tube type heat exchangers which include multiple tubes through which fluid flows. The tubes are divided into two sets—the first set contains the fluid to be heated or cooled; the second set contains the fluid responsible for triggering the heat exchange, in other words, the fluid that either removes heat from the first set of tubes by absorbing and transmitting the heat away or warms the first set by transmitting its own heat to the fluid inside. When designing this type of exchanger, care must be taken in determining the correct tube wall thickness as well as tube diameter, to allow optimum heat exchange. In terms of flow, shell and tube heat exchangers can assume any of three flow path patterns.

Heat exchangers in NGL facilities can also be plate and frame type heat exchangers. Plate heat exchangers include thin plates joined together with a small amount of space in between, often maintained by a rubber gasket. The surface area is large, and the corners of each rectangular plate feature an opening through which fluid can flow between plates, extracting heat from the plates as it flows. The fluid channels themselves alternate hot and cold liquids, meaning that the heat exchangers can effectively cool as well as heat fluid. Because plate heat exchangers have large surface area, they can sometimes be more effective than shell and tube heat exchangers.

Other types of heat exchangers can include regenerative heat exchangers and adiabatic wheel heat exchangers. In a regenerative heat exchanger, the same fluid is passed along both sides of the exchanger, which can be either a plate heat exchanger or a shell and tube heat exchanger. Because the fluid can get very hot, the exiting fluid is used to warm the incoming fluid, maintaining a near constant temperature. Energy is saved in a regenerative heat exchanger because the process is cyclical, with almost all relative heat being transferred from the exiting fluid to the incoming fluid. To maintain a constant temperature, a small quantity of extra energy is needed to raise and lower the overall fluid temperature. In the adiabatic wheel heat exchanger, an intermediate liquid is used to store heat, which is then transferred to the opposite side of the heat exchanger. An adiabatic wheel consists of a large wheel with threads that rotate through the liquids—both hot and cold—to extract or transfer heat. The heat exchangers described in this disclosure can include any one of the heat exchangers described earlier, other heat exchangers, or combinations of them.

Each heat exchanger in each configuration can be associated with a respective thermal duty (or heat duty). The thermal duty of a heat exchanger can be defined as an amount of heat that can be transferred by the heat exchanger from the hot stream to the cold stream. The amount of heat can be calculated from the conditions and thermal properties of both the hot and cold streams. From the hot stream point of view, the thermal duty of the heat exchanger is the product of the hot stream flow rate, the hot stream specific heat, and a difference in temperature between the hot stream inlet temperature to the heat exchanger and the hot stream outlet temperature from the heat exchanger. From the cold stream point of view, the thermal duty of the heat exchanger is the product of the cold stream flow rate, the cold stream specific heat and a difference in temperature between the cold stream outlet from the heat exchanger and the cold stream inlet temperature from the heat exchanger. In several applications, the two quantities can be considered equal assuming no heat loss to the environment for these units, particularly, where the units are well insulated. The thermal duty of a heat exchanger can be measured in watts (W), megawatts (MW), millions of British Thermal Units per hour (Btu/hr), or millions of kilocalories per hour (Kcal/h). In the configurations described here, the thermal duties of the heat exchangers are provided as being "about X MW," where "X" represents a numerical thermal duty value. The numerical thermal duty value is not absolute. That is, the actual thermal duty of a heat exchanger can be approximately equal to X, greater than X or less than X.

Flow Control System

In each of the configurations described later, process streams (also called "streams") are flowed within each plant in a NGL fractionation plant and between plants in the NGL fractionation plant. The process streams can be flowed using one or more flow control systems implemented throughout the NGL fractionation plant. A flow control system can include one or more flow pumps to pump the process streams, one or more flow pipes through which the process streams are flowed and one or more valves to regulate the flow of streams through the pipes.

In some implementations, a flow control system can be operated manually. For example, an operator can set a flow rate for each pump and set valve open or close positions to regulate the flow of the process streams through the pipes in the flow control system. Once the operator has set the flow rates and the valve open or close positions for all flow control systems distributed across the NGL fractionation plant, the flow control system can flow the streams within a plant or between plants under constant flow conditions, for example, constant volumetric rate or such flow conditions. To change the flow conditions, the operator can manually operate the flow control system, for example, by changing the pump flow rate or the valve open or close position.

In some implementations, a flow control system can be operated automatically. For example, the flow control system can be connected to a computer system to operate the flow control system. The computer system can include a computer-readable medium storing instructions (such as flow control instructions and such instructions) executable by one or more processors to perform operations (such as flow control operations). An operator can set the flow rates and the valve open or close positions for all flow control systems distributed across the NGL fractionation plant using the computer system. In such implementations, the operator can manually change the flow conditions by providing inputs through the computer system. Also, in such implementations, the computer system can automatically (that is, without manual intervention) control one or more of the flow control systems, for example, using feedback systems implemented in one or more plants and connected to the computer system. For example, a sensor (such as a pressure sensor, temperature sensor or other sensor) can be connected to a pipe through which a process stream flows. The sensor can monitor and provide a flow condition (such as a pressure, temperature, or other flow condition) of the process stream to the computer system. In response to the flow condition exceeding a threshold (such as a threshold pressure value, a threshold temperature value, or other threshold value), the computer system can automatically perform operations. For example, if the pressure or temperature in the pipe exceeds the threshold pressure value or the threshold temperature value, respectively, the computer system can provide a signal to the pump to decrease a flow rate, a signal to open a valve to relieve the pressure, a signal to shut down process stream flow, or other signals.

In some examples, waste heat from a natural gas liquid fractionation plant can be recovered from a network of one or more heat exchangers located in the natural gas liquid fractionation plant. The waste heat recovered by the heat exchangers can be used to power a Kalina cycle based waste heat to cooling conversion plant. A Kalina cycle is an energy conversion system that uses a mixture of ammonia and water in a closed loop arrangement. For instance, the plant can produce between about 350 MM Btu/h and about 450 MM Btu/h of sub-ambient cooling capacity, such as about 350 MM Btu/h, about 400 MM Btu/h, or about 450 MM Btu/h.

The waste heat can also be used to power a multi-effect distillation (MED) system for production of desalinated water from brackish stream or sea water. For instance, the recovered waste heat from the natural gas liquid fractionation plant can be used to generate between about 50,000 m3/day and about 70,000 m3/day of fresh water, such as about 50,000 m3/day, about 60,000 m3/day, or about 70,000 m3/day.

FIG. 1A is a schematic diagram of an example of a low grade waste heat recovery system. The schematic includes a storage tank 701 to store buffer fluid, for example, oil, pressurized water, or other buffer fluid. The buffer fluid from the storage tank 701 is flowed to a heat exchanger network 799 which, in some implementations, can include 14 heat exchangers (for example, heat exchangers 702a, 702b, 702c, 702d, 702e, 702f, 702g, 702h, 702i, 702j, 702k, 702l, 702m, 702n), which are described in detail later. The buffer fluid is flowed through the heat exchanger network 799 and heated by streams in the NGL fractionation plant (described later). The heated buffer fluid is flowed to a MED system 7000 that can generate potable water as described later. The temperature of the buffer fluid decreases as it exits the MED system 7000 and flows back to the storage tank 701 to be flowed again through the heat exchanger network 799. The heated buffer fluid can also be used to generate power and sub-ambient cooling in a Kalina cycle system 705.

Figure 1B:
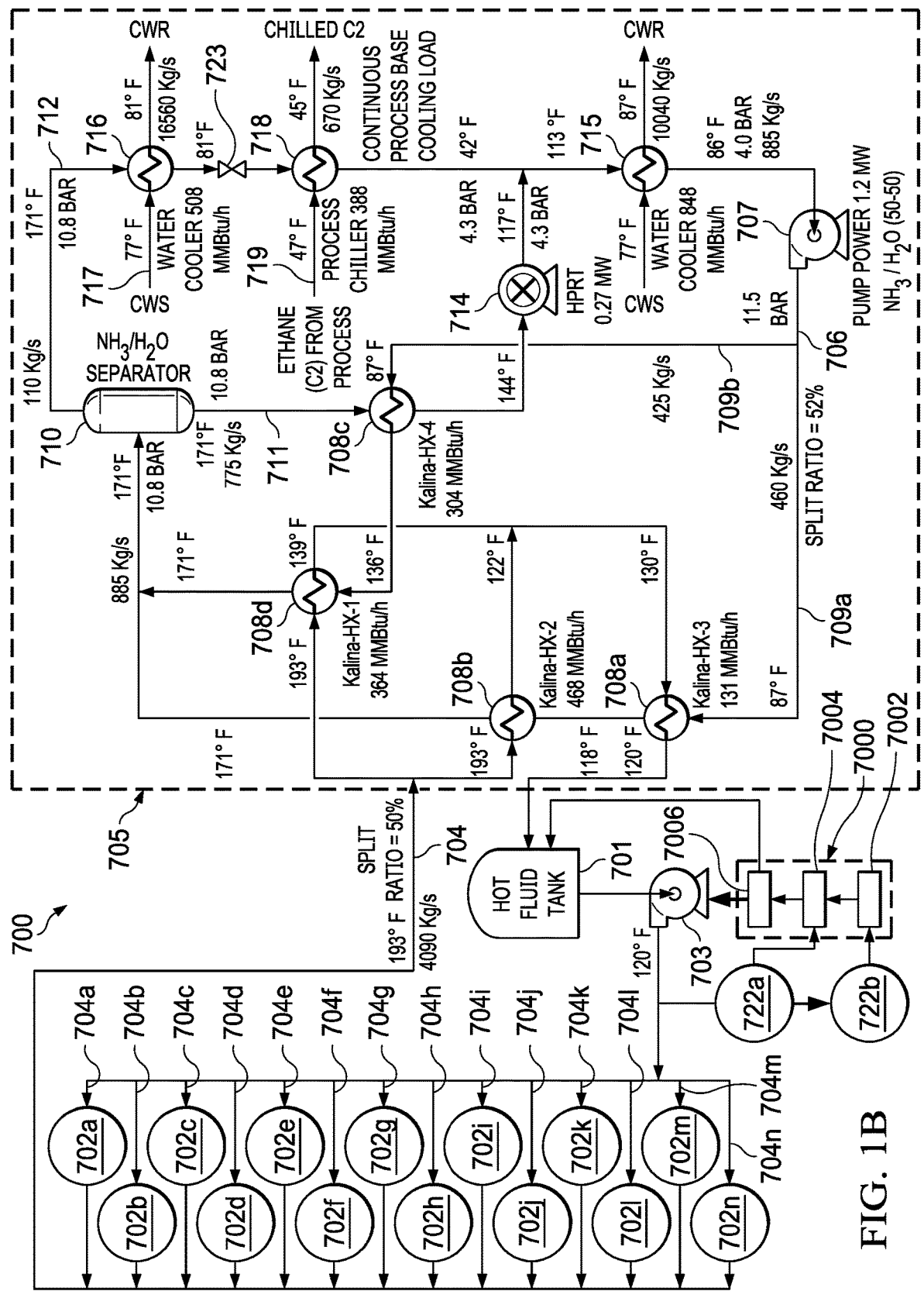
FIG. 1B is a diagram of a Kalina cycle based waste heat to cooling conversion plant.
Figure 1C:
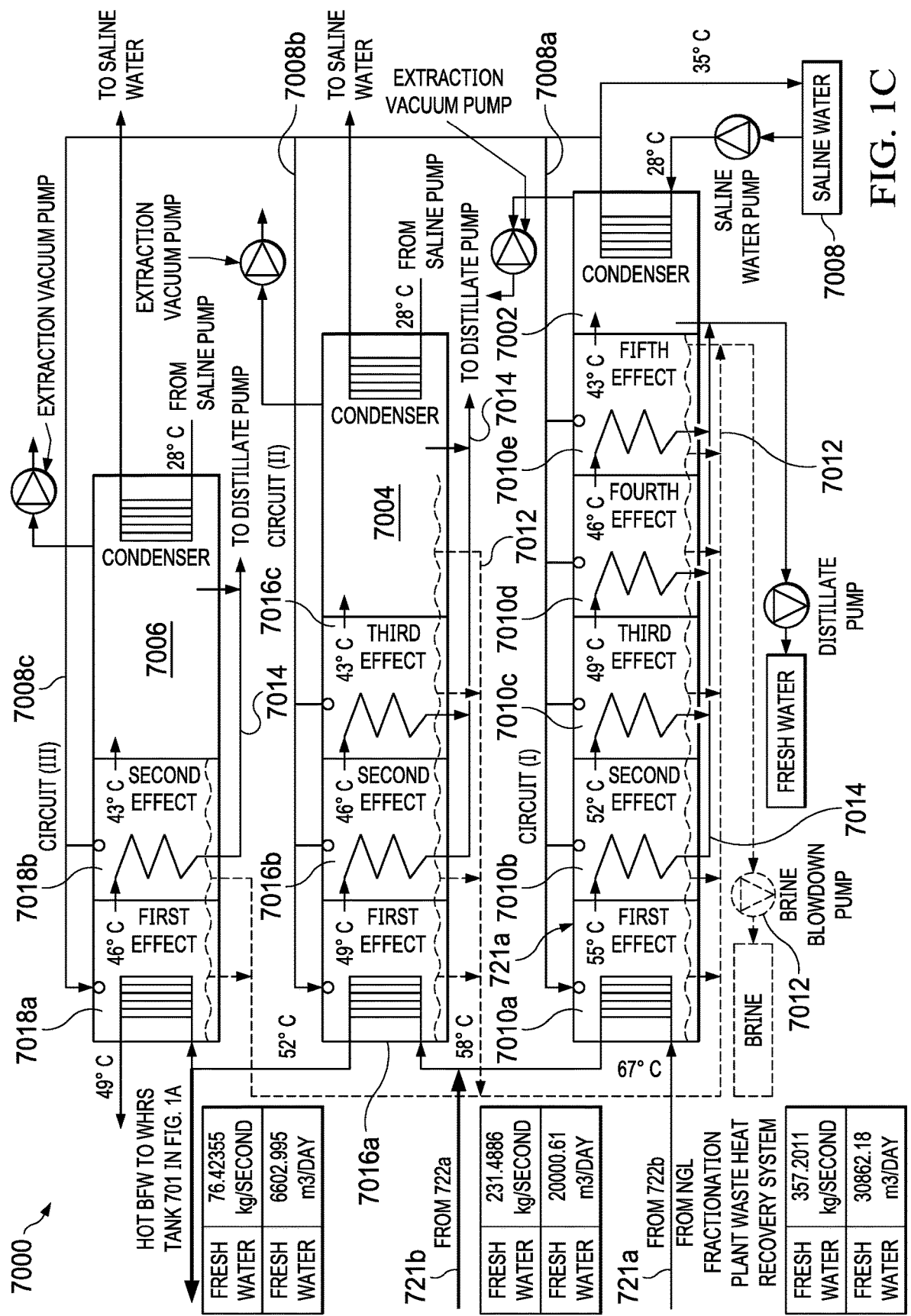
FIG. 1C is a diagram of a MED system.

Referring to FIG. 1B, a Kalina cycle based plant 700 includes an storage tank 701 that stores buffer fluid, such as oil, water, an organic fluid, or another buffer fluid. For instance, the buffer fluid in the storage tank 701 can be at a temperature of between about 110° F. and about 130° F., such as about 110° F., about 120° F., or about 130° F. The buffer fluid is pumped by a buffer fluid circulation pump 703 from the storage tank 701 to heat exchangers in the gas processing plant for recovery of waste heat. A portion 704 of the buffer fluid is pumped to a first circuit 790 (FIG. 1A) including heat exchangers 702a-702n in the gas processing plant to recover waste heat to be used to power the Kalina cycle based energy conversion plant 700. A portion 721 of the buffer fluid is pumped to a second circuit 792 (FIG. 1A) including heat exchangers 722a, 722b (FIG. 1A) in the gas processing plant to recover waste heat to be used to power a desalination plant 7000 (FIG. 1C).

Individual streams of buffer fluid 704a-704n are heated in each of the heat exchangers 702a-702n in the first circuit 790 (FIG. 1A) by recovery of waste heat from process streams in the natural gas liquid fractionation plant. The heat exchangers 702a-702n can be configured such that they are parallel to one another in relation to the flow of the buffer fluid 704a-704n. The heated streams of buffer fluid 704a-704n are joined into a single header of hot buffer fluid 704 downstream of the heat exchangers 702a-702n. The hot buffer fluid 704 can be at a temperature of, for example, between about 180° F. and about 200° F., such as about 180° F., about 190° F., or about 200° F. The hot buffer fluid 704 can flow at a rate of between about 3500 kg/s and about 4500 kg/s, such as about 3500 kg/s, about 4000 kg/s, or about 4500 kg/s.

The heat from the hot buffer fluid 704 is used to heat a working fluid 706, such as an ammonia-water mixture, in a Kalina cycle 705, which is used to provide in-plant sub-ambient cooling. For instance, the plant 700 can produce between about 350 MM Btu/h and about 450 MM Btu/h of sub-ambient cooling capacity, such as about 350 MM Btu/h, about 400 MM Btu/h, or about 450 MM Btu/h. The cooling capacity produced by the Kalina cycle 705 can save power that would have been expended in mechanical refrigeration.

For instance, use of the Kalina cycle 705 to provide in-plant sub-ambient cooling can avoid power consumption of between about 40 MW and about 50 MW, such as about 40 MW, about 45 MW, or about 50 MW.

The Kalina cycle 705 includes a pump 707. The pump 707 can consume, for instance, between about 1 MW and about 2 MW of power, such as about 1 MW, about 1.5 MW, or about 2 MW. The pump 707 can pump the ammonia-water mixture 706 from a starting pressure of, for instance, between about 3.5 Bar and about 4.5 Bar, such as about 3.5 Bar, about 4 Bar, or about 4.5 Bar; to a higher pressure of, for instance, between about 11 Bar and about 12 Bar, such as about 11 Bar, about 11.5 Bar, or about 12 Bar. The pump 707 can be sized to receive the ammonia-water mixture 706 at a flow rate of between about 500 kg/s and about 1000 kg/s, such as about 500 kg/s, about 750 kg/s, or about 1000 kg/s.

The working fluid 706 can be a mixture of ammonia and water, for instance, between 45% and 55% ammonia, such as about 45%, about 50%, or about 55% ammonia; and between 45% and 55% water, such as about 45%, about 50%, or about 55% water. The working fluid 706 is pumped by the pump 707 into a network of heat exchangers 708a, 708b, 708d that together achieve partial evaporation of the working fluid 706 using heat from the buffer fluid 704, directly or indirectly. The heat exchangers are divided into two parallel branches: a first branch including the heat exchangers 708a and 708b, and the second branch including a heat exchanger 708c and the heat exchanger 708d. The working fluid 706 flowing along the two branches is heated and partially vaporized using between about 500 MM Btu/h and about 1500 MM Btu/h, such as about 500 MM Btu/h, about 1000 MM Btu/h, or about 1500 MM Btu/h, of waste heat collected by the buffer fluid.

The first branch of the heat exchangers 708a, 708b is in a parallel configuration with the second branch of the heat exchangers 708c, 708d in relation to the flow of the working fluid 707. Within each branch, the two heat exchangers are arranged in series in relation to the flow of the working fluid 706, such that the heat exchanger 708a is in series with the heat exchanger 708b and the heat exchanger 708c is in series with the heat exchanger 708d. With respect to the flow of the buffer fluid 706, the heat exchanger 708b is in a parallel configuration with the heat exchanger 708d, and the parallel heat exchangers 708b and 708d are in series with the heat exchanger 708a.

The heat exchanger 708a can have a thermal duty of, for instance, between about 100 MM Btu/h and about 200 MM Btu/h, such as about 100 MM Btu/h, about 125 MM Btu/h, about 150 MM Btu/h, about 175 MM Btu/h, or about 200 MM Btu/h. The heat exchanger 708b can have a thermal duty of, for instance, between about 400 MM Btu/h and about 500 MM Btu/h, such as about 400 MM Btu/h, about 425 MM Btu/h, about 450 MM Btu/h, about 475 MM Btu/h, about 500 MM Btu/h. The heat exchanger 708c can have a thermal duty of, for instance, between about 150 MM Btu/h and about 250 MM Btu/h, such as about 150 MM Btu/h, about 175 MM Btu/h, about 200 MM Btu/h, about 225 MM Btu/h, or about 250 MM Btu/h. The heat exchanger 708d can have a thermal duty of, for instance, between about 300 MM Btu/h and about 400 MM Btu/h, such as about 300 MM Btu/h, about 325 MM Btu/h, about 350 MM Btu/h, about 375 MM Btu/h, or about 400 MM Btu/h. The buffer fluid 704 flowing through the network of heat exchangers 708a, 708b, 708d cools and returns to the storage tank 701.

The working fluid 706 exiting the pump 707 can have a temperature of, for instance, between about 80° F. and about 100° F., such as about 80° F., about 90° F., or about 100° F.

The working fluid 706 from the pump 707 is split into two portions, for instance, with a split ratio of about between about 50% and about 54%, such as about 50%, about 52%, or about 54%.

A first portion 709a of the working fluid 706 from the pump 707 is pre-heated and partially vaporized by exchange with the buffer fluid 704 in the heat exchangers 708a and 708b, which are in series in relation to the working fluid flow. For instance, the first portion 709a of the working fluid is heated to a temperature of between about 160° F. and about 180° F., such as about 160° F., about 170° F., or about 180° F.

A second portion 709b of the working fluid 706 from the pump 707 is pre-heated and partially vaporized by exchange with liquid ammonia and water 711 (from a liquid-vapor separator 710, described in the following paragraphs) in the heat exchanger 708c. For instance, the second portion 709b is heated to a temperature of between about 120° F. and about 140° F., such as about 120° F., about 130° F., or about 140° F. The heated second portion 709b is further heated and partially vaporized by exchange with the buffer fluid 704 in the heat exchanger 708d, which is in series in relation to the working fluid flow with the heat exchanger 708c. For instance, the second portion 709b is heated to a temperature of between about 160° F. and about 180° F., such as about 160° F., about 170° F., or about 180° F.

The first and second portions of the working fluid, which are heated and partially vaporized, flow into the liquid-vapor separator 710 that separates liquid from vapor, such as liquid ammonia and water from ammonia-water vapor. The pressure of the working fluid upon entry into the liquid-vapor separator 710 can be, for instance, between about 10 Bar and about 11 Bar, such as about 10 Bar, about 10.5 Bar, or about 11 Bar. A liquid stream 711 of the working fluid, such as liquid ammonia and water, which is a lean stream, exits the bottom of the separator 710 and a vapor stream 712 of the working fluid, such as ammonia-water vapor, exits the top of the separator 710.

The vapor stream 712, which is a rich stream, flows to a cooler 716, that condenses the stream 712 at high pressure. The condensed stream 712 exiting the water cooler 716 is at a temperature of between about 70° F. and about 90° F., such as about 70° F., about 80° F., or about 90° F. The stream 712 is cooled in the water cooler 716 by exchange with a stream of cooling fluid 717, such as water, which is heated from a temperature of between about 70° F. and about 90° F., such as about 70° F., about 80° F., or about 90° F.; to a temperature of between about 75° F. and about 95° F., such as about 75° F., about 85° F., or about 95° F. The cooling fluid can flow through the heat exchanger at a rate of between about 15000 kg/s and about 20000 kg/s, such as about 15000 kg/s, about 16000 kg/s, about 17000 kg/s, about 18000 kg/s, about 19000 kg/s, or about 20000 kg/s. The cooler 716 can have a thermal duty of between about 400 MM Btu/h and about 600 MM Btu/h, such as about 400 MM Btu/h, about 500 MM Btu/h, or about 600 MM Btu/h.

The condensed stream 712 is throttled in a throttling valve 723 to a lower pressure of between about 4 Bar and about 5 Bar, such as about 4 Bar, about 4.5 Bar, or about 5 Bar, to generate cooling capacity. The working fluid 712 exiting the throttling valve 723 is at a temperature of between about 30° F. and about 50° F., such as about 30° F., about 40° F., or about 50° F., and is used for in-plant cooling in a deethanizer section of the natural gas liquid fractionation plant. For instance, the working fluid 712 is used in a process chiller 718 to cool a stream of ethane 719 from the deethanizer section, such as a top stream of ethane gas from a deethanizer. The ethane 719 is cooled from a temperature of between about 45° F. and about 55° F., such as about 45° F., about 50° F., or about 55° F.; to a temperature of between about 40° F. and about 50° F., such as about 40° F., about 45° F., or about 50° F. The ammonia-water 712 can be heated to a temperature of between about 35° F. and about 45° F., such as about 35° F., about 40° F., or about 45° F. The process chiller 718 can have a thermal duty of between about 300 MM Btu/h and about 500 MM Btu/h, such as about 300 MM Btu/h, about 400 MM Btu/h, or about 500 MM Btu/h. The ethane 719 can flow through the process chiller 718 at a flow rate of between about 600 kg/s and about 800 kg/s, such as about 600 kg/s, about 700 kg/s, or about 800 kg/s.

The liquid working fluid 711 flows via the heat exchanger 708c to a high pressure recovery turbine (HPRT) 714, for example, a hydraulic liquid turbine, for power generation. After exchange at the heat exchanger 708c, the temperature of the ammonia and water 711 is between about 130° F. and about 150° F., such as about 130° F., about 140° F., or about 150° F. The HPRT 714 can generate, for example, between about 0.1 MW and about 0.5 MW of power, such as about 0.1 MW, about 0.25 MW, or about 0.5 MW of power. Power is generated by the HPRT 714 using a flow rate of the liquid stream 711 of between about 500 kg/s and about 1000 kg/s, such as about 500 kg/s, about 750 kg/s, or about 1000 kg/s. The HPRT 714 reduces the pressure of the liquid stream 711 to, for instance, between about 4 Bar and about 5 Bar, such as about 4 Bar, about 4.5 Bar, or about 5 Bar; and reduces the temperature of the liquid stream 711 to, for instance, between about 110° F. and about 130° F., such as about 110° F., about 120° F., or about 130° F.

The stream 712 and the stream 711 combine into mixture single stream of the working fluid 706 after exiting the turbine 714 and the chiller 716. The working fluid 706 is cooled in a cooler 715, such as a cooling water condenser or an air cooler, by exchange with cooling water. The cooler 715 can have a thermal duty of, for example, between about 800 MM Btu/h and about 1000 MM Btu/h, such as about 800 MM Btu/h, about 900 MM Btu/h, or about 1000 MM Btu/h. The cooler 715 cools the working fluid 706 to a temperature of, for example, between about 80° F. and about 100° F., such as about 80° F., about 90° F., or about 100° F.

The cooling water used to cool the working fluid 706 can have a temperature of between about 70° F. and about 90° F., such as about 70° F., about 80° F., or about 90° F.; and can be heated to a temperature of between about 80° F. and about 100° F., such as about 80° F., about 90° F., or about 100° F. In some examples, the temperature of the cooling water can vary depending on the season. For instance, the cooling water can have a lower temperature in winter than in summer. The volume of cooling water flowing through the cooler 715 can be between about 9000 kg/s and about 11000 kg/s, such as about 9000 kg/s, about 10000 kg/s, or about 11000 kg/s.

Using a Kalina cycle for waste heat to cooling conversion can offer advantages. A Kalina cycle offers a degree of freedom in that the composition of the working fluid can be adjusted. This degree of freedom allows a Kalina cycle to be adapted to particular operating conditions, for example, to a particular heat source or a particular cooling fluid, in order to improve or optimize energy conversion and heat transfer. Furthermore, because ammonia has a similar molecular weight as water, ammonia-water vapor as a working fluid behaves similarly to steam, thus permitting the use of standard steam turbine components. At the same time, the use of a binary fluid allows the composition of the fluid to be varied throughout the cycle, for example, to provide a composition at the evaporator that is richer in ammonia and a composition at the condenser that is leaner in ammonia. In addition, ammonia is an environmentally friendly compound that is less hazardous than compounds, such as iso-butane, that are often used in other power conversion cycles.

Figure 1D:
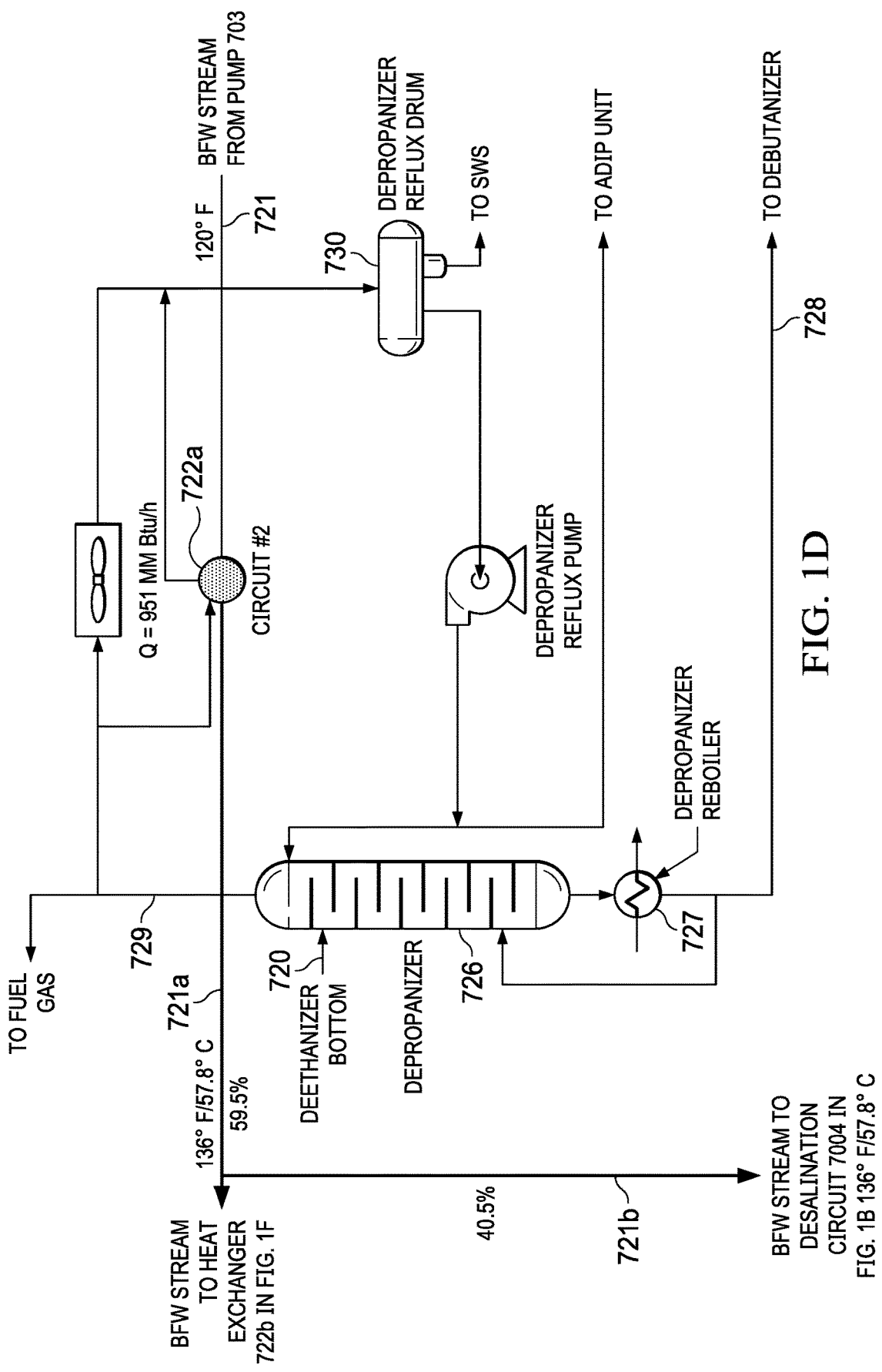
FIG. 1D is a diagram of a depropanizer section of a NGL fractionation plant.
Figure 1E:
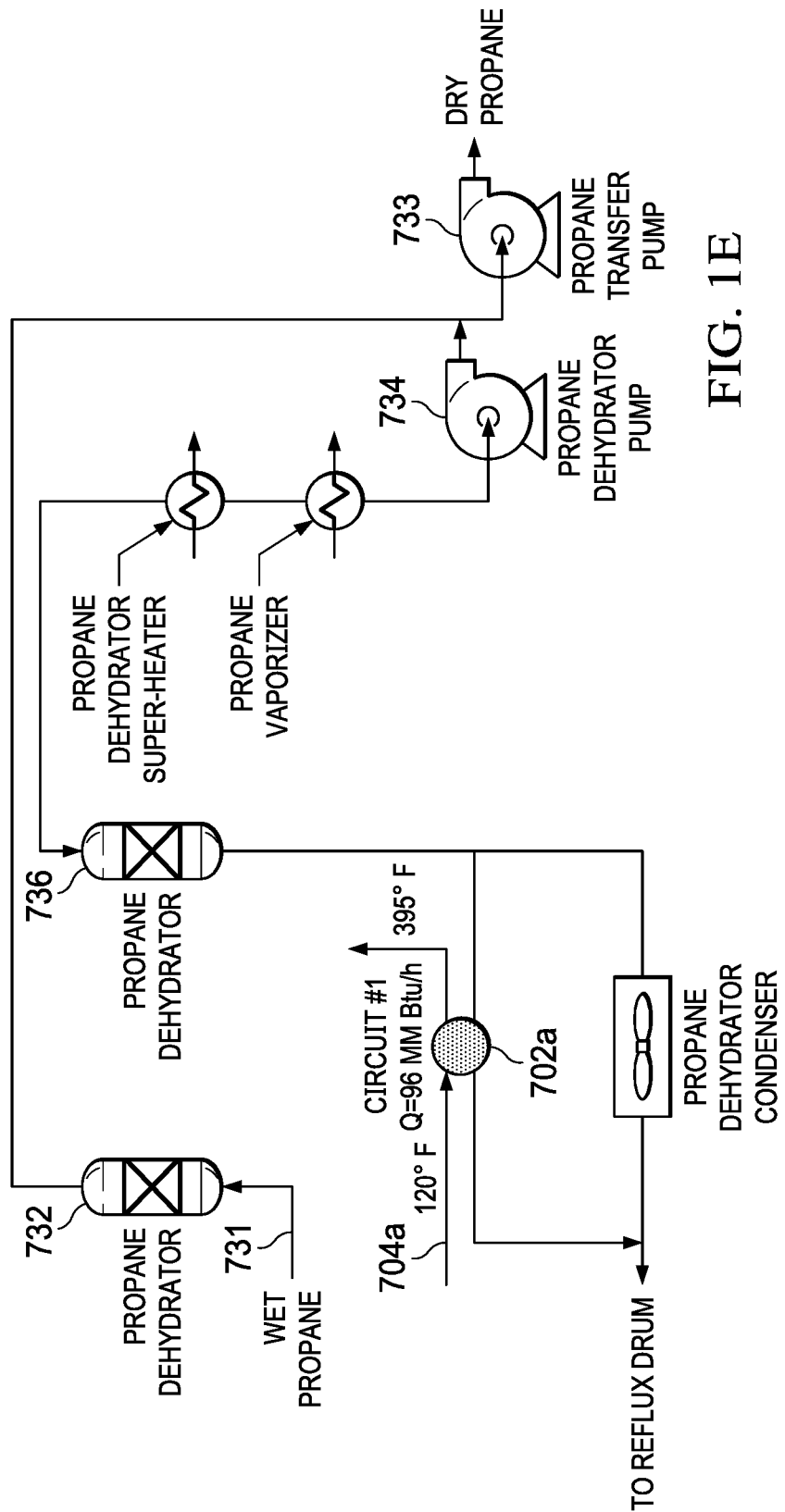
FIG. 1E is a diagram of a propane dehydrator section of a NGL fractionation plant.

Referring to FIG. 1C, waste heat from the heat exchangers 722a, 722b in the second circuit 792 (FIG. 1A) is used in a multi-effect distillation (MED) system 7000 to produce fresh water from saline. The buffer fluid 721 from the storage tank 701 (FIG. 1B) downstream of the heat exchanger 722a is split into two streams 721a, 721b in the natural gas liquid fractionation plant, as discussed infra. As shown in FIG. 1D, the stream 721b is heated by waste heat recovered from low grade waste heat sources in the natural gas liquid fractionation plant. As shown in FIG. 1E, the stream 721b is heated by the second circuit 792. The recovered waste heat from the natural gas liquid fractionation plant can be used to generate between about 50,000 m$^3$/day and about 70,000 m$^3$/day of fresh water, such as about 50,000 m$^3$/day, about 60,000 m$^3$/day, or about 70,000 m$^3$/day.

The MED system 7000 can include three trains 7002, 7004, 7006 (FIG. 1B). Each train includes multiple effects, which are heat exchangers that distill saline into fresh water and brine. In the example of FIG. 1C, the first train 7002 includes five effects 7010a-7010e in series; the second train 7004 includes three effects 7016a-7016c in series; and the third train includes two effects 7018a-7018b in series. In some examples, the MED system 7000 can include more than three trains or fewer than three trains. In some examples, the number of effects in the trains can be increased or reduced. If the MED system includes fewer trains or fewer effects per train, the quantity of fresh water produced by the MED system will be reduced.

Saline water 7008 is pumped into the trains 7002, 7004, 7006 by a saline pump 7010. The saline water 7008 can be at a temperature of between about 25° C. and about 35° C., such as about 25° C., about 30° C., or about 35° C. A first portion 7008a of the saline is pumped into the first train 7002 and is distributed onto the effects 7010a-7010e of the first train 7002. In the first effect 7010a of the first train 7002, the saline 7008a is heated by exchange with the stream 721a of buffer fluid from the natural gas liquid fractionation plant. The stream 721a of buffer fluid can be at a temperature of between about 60° C. and about 70° C., such as about 60° C., about 65° C., or about 70° C.; and can be cooled to a temperature of between about 55° C. and about 65° C., such as about 55° C., about 60° C., or about 65° C. The stream 721a of buffer fluid can supply the first train 7002 with between about 160 MW and about 180 MW of waste heat, such as about 160 MW, about 170 MW, or about 180 MW.

When the saline 7008a is heated by exchange with the stream 721a of buffer fluid in the first effect 7010a, potable water is evaporated and the unevaporated material is purged as brine 7012. The produced vapor from the first effect 7010a is provided to the second effect 7010b, where the heat from condensation of the produced potable water vapor evaporates potable water in the saline 7008a and causes the vapor produced in the first effect to condense into water. The water is removed as fresh water 7014, the brine from the second effect 7010b is purged, and the vapor produced in the second effect 7010b is provided to the third effect 7010c. The process continues through the fourth and fifth effects 7010d, 7010e, with condensation of produced potable water vapor from a previous effect causing evaporation of potable water from saline in the subsequent effect. The temperature drop between each two effects is between about 2° C. and about 4° C., such as about 2° C., about 3° C., or about 4° C.

A second portion 7008b of the saline is pumped into the second train 7004 and distributed onto the effects 7016a-7016c of the second train 7004. The stream of buffer fluid 721a from the first train 7002 is combined with the stream 721b of buffer fluid from the natural gas liquid fractionation plant to form a combined stream 721. The combined stream 721 is used to heat the saline 7008b in the first effect 7016a of the second train 7004. The buffer fluid 721 can be at a temperature of between about of between about 55° C. and about 65° C., such as about 55° C., about 60° C., or about 65° C., and can be cooled in the first effect 7016a of the second train 7004 to a temperature of between about 50° C. and about 60° C., such as about 50° C., about 55° C., or about 60° C. The buffer fluid stream 721 can supply the second train 7004 with between about 180 MW and about 200 MW of waste heat, such as about 180 MW, about 190 MW, or about 200 MW.

Vapor produced in the first effect 7016a of the second train 7004 is provided to the second effect 7016b of the second train 7004 and the brine 7012 is purged. In the second and third effects 7016b, 7016c of the second train, vapor produced in the previous effect is used to heat the saline, causing the vapor to condense into water. The water is removed as fresh water 7014, the bring 7012 is purged, and the produced vapor is provided to the subsequent effect.

Similarly, a third portion 7008c of the saline is pumped into the third train 7006 and distributed onto the effects 7017a, 7017b of the third train. Water is removed as fresh water 7014 and brine 7012 is purged. The third train 7006 is powered by energy from the stream 721 of buffer fluid received from the second train 7004. The buffer fluid 721 can be at a temperature of between about of between about 50° C. and about 60° C., such as about 50° C., about 55° C., or about 60° C., and can be cooled in the first effect 7016a of the third train 7006 to a temperature of between about 45° C. and about 55° C., such as about 45° C., about 50° C., or about 55° C. The stream 721 of buffer fluid can supply the third train 7006 with between about 80 MW and about 100 MW of waste heat, such as about 80 MW, about 90 MW, or about 100 MW.

As shown in FIG. 1D, the stream 721 of buffer fluid is returned to the storage tank 701 shown in FIG. 1B.

The multiple trains in the MED system provide a match between the heat duty load and temperature drop between effects to render efficient production of fresh water from the available waste heat.

In some examples, the stream 721 of buffer fluid that provides energy to the MED system 7000 can be pressurized water and the stream 704 of buffer fluid that provides energy to the Kalina cycle based plant 700 can be a different fluid, such as hot oil. When the two stream of buffer fluid are different, two separate storage tanks and two separate pumps are used.

The MED system 7000 and the Kalina cycle based plant 700 are parallel systems. The MED system 7000 can be operated independently from the Kalina cycle based plant 700 and vice versa, such that waste heat from the natural gas liquid fractionation plant can be used for only desalination of water, only for generation of in-plant sub-ambient cooling capacity, or both. In some examples, the Kalina cycle based plant can be used for power generation rather than for generation of in-plant sub-ambient cooling capacity. In some examples, the Kalina cycle based plant can be used to provide ambient air cooling in the natural gas liquid fractionation plant or in the nearby community.

The heat exchangers 702a-702n and 722a-722b can be incorporated into various sections of a natural gas liquid fractionation plant to recover waste heat from liquid or vapor streams in those sections.

Figure 1F:
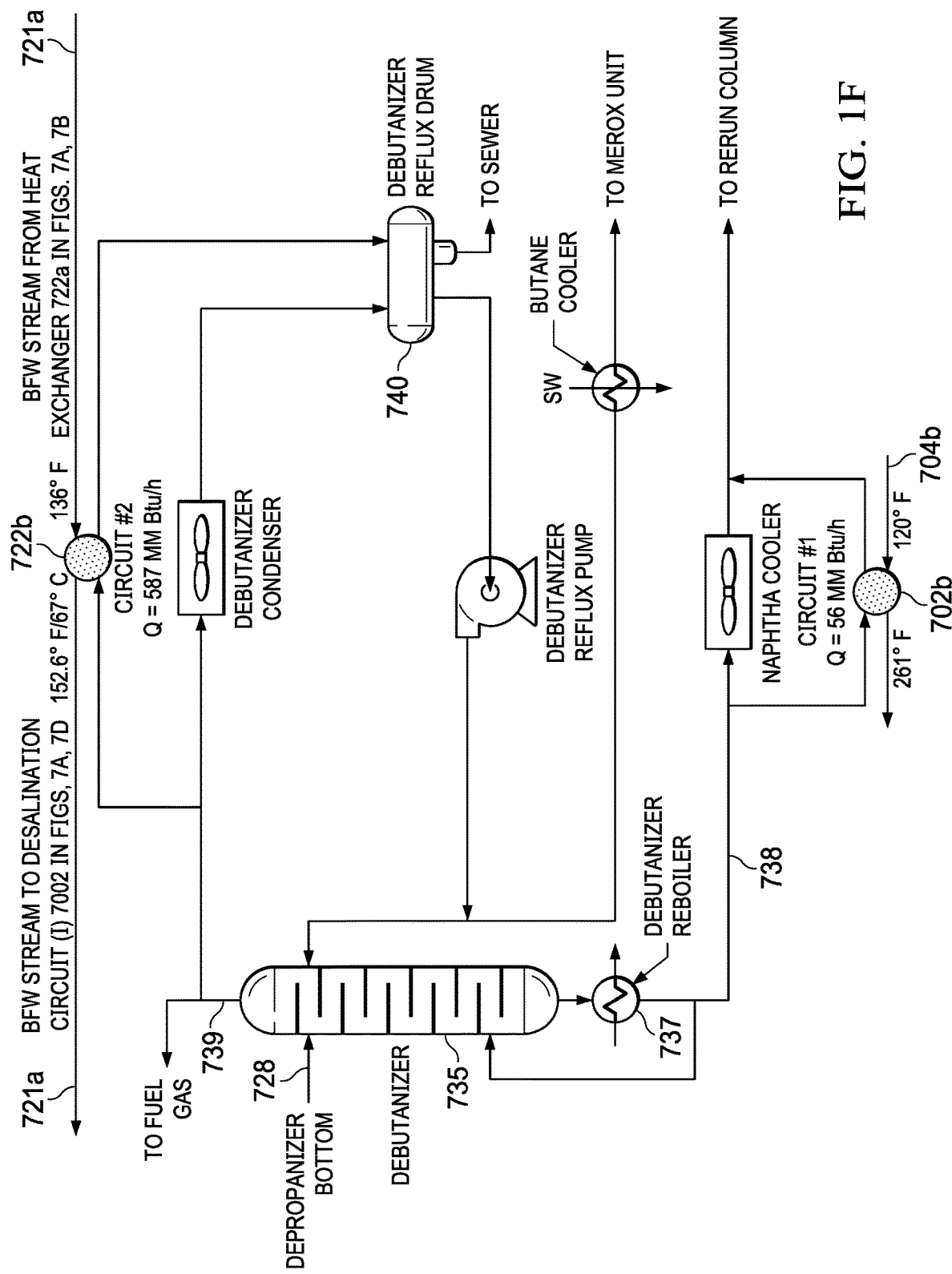
FIG. 1F is a diagram of a debutanizer section of a NGL fractionation plant.

Referring to FIG. 1D, in a depropanizer section of the natural gas liquid fractionation plant, a C3+ NGL bottoms stream 720 from a deethanizer is received into a depropanizer 726. A bottoms stream from the depropanizer 726 is processed in a reboiler 727. Liquid propane from the reboiler 727 is returned to the depropanizer 726 and a C4+ NGL bottoms product 728 from the depropanizer 726 are provided to a debutanizer 735 (FIG. 1F).

Propane gas 729 exits from the top of the depropanizer 726 and is cooled in the heat exchanger 722a by exchange with the stream 721 of buffer fluid. The heat exchanger 722a belongs to the second circuit 792 (FIG. 1A) of heat exchangers for use with the MED system 7000. The cooled propane gas 729 is collected in a reflux drum 730. A portion of the liquid propane from the reflux drum 730 is returned to the depropanizer 726, and a portion of the liquid propane from the reflux drum 730 is either treated (for instance, in an ADIP unit) or sent to users as untreated product. The presence of the heat exchanger 722a recovers waste heat from the propane gas 729, enabling other components (for instance, cooling units or condensers) that would have been used to cool the propane gas 729 to be bypassed or eliminated from the depropanizer section.

In some examples, the propane gas 729 can be cooled. The stream 721 of buffer fluid can be heated to a temperature of between about 120° F. and about 140° F., such as about 120° F., about 130° F., or about 140° F. The thermal duty of the heat exchanger 722a can be between about 900 MM Btu/h and about 1000 MM Btu/h, such as about 900 MM Btu/h, about 925 MM Btu/h, about 950 MM Btu/h, about 975 MM Btu/h, or about 1000 MM Btu/h.

The heated stream 721 of buffer fluid is split into a first stream 721a that is sent to the heat exchanger 722b (FIG. 1F) and a second stream 721b that is sent to the desalination circuit 7004 of the MED system 7000 (FIG. 1C). The split directed to the second stream 721b can be between about 35% and about 45%, such as about 35%, about 40%, or about 45%, with the remainder directed to the first stream 721a.

Referring to FIG. 1E, in a propane dehydrator section of the natural gas liquid fractionation plant, wet propane 731 is dehydrated in a propane dehydrator 732. The wet propane 731 can be, for instance, the propane gas 729 in the depropanizer section (FIG. 1D). A portion of the dry propane from the propane dehydrator 732 is output as dry propane 733, for instance, to a propane refrigeration section (FIG. 1L). Another portion 734 of the propane from the propane dehydrator 732 is further dehydrated in a propane dehydrator 736. The dry propane 734 output from the propane dehydrator 732 is cooled in the heat exchanger 702a by exchange with the stream 704a of buffer fluid. The heat exchanger 702a belongs to the first circuit 790 (FIG. 1A) of heat exchangers. The cooled dry propane 734 is returned to the depropanizer reflux drum 730 (FIG. 1D). The presence of the heat exchanger 702a recovers waste heat from the dry propane 734, enabling other components (for instance, cooling units or condensers) that would have been used to cool the dry propane 734 to be bypassed or eliminated from the propane dehydrator section.

In some examples, the dry propane 734 can be cooled. The stream 704a of buffer fluid can be heated to a temperature of between about 390° F. and about 410° F., such as about 390° F., about 400°, or about 410° F. The thermal duty of the heat exchanger 702a can be between about 50 MM Btu/h and about 150 MM Btu/h, such as about 50 MM Btu/h, about 75 MM Btu/h, about 100 MM Btu/h, about 125 MM Btu/h, or about 150 MM Btu/h.

Referring to FIG. 1F, in a debutanizer section of the natural gas liquid fractionation plant, the C4+ NGL bottoms product 728 from the depropanizer 726 (FIG. 1D) are received into a debutanizer 735. A bottoms stream from the debutanizer 735 is processed in a reboiler 737. Vaporized butane from the reboiler is returned to the debutanizer 735. A C5+ bottoms product 738 from the debutanizer 735 is cooled in the heat exchanger 702b by exchange with the stream 704b of buffer fluid. The heat exchanger 702b belongs to the first circuit 790 (FIG. 1A) of heat exchangers. The cooled C5+ bottoms product 738 is provided to a rerun unit (FIG. 1P). The presence of the heat exchanger 702b recovers waste heat from the C5+ bottoms product 738, enabling other components (for instance, a naphtha cooling unit) that would have been used to cool the C5+ bottoms product 738 to be bypassed or eliminated from the debutanizer section.

In some examples, the C5+ bottoms product 738 can be cooled. The stream 702b of buffer fluid can be heated to a temperature of between about 250° C. and about 270° C., such as about 250° F., about 260° F., or about 270° F. The thermal duty of the heat exchanger 702b can be between about 25 MM Btu/h and about 125 MM Btu/h, such as about 25 MM Btu/h, about 50 MM Btu/h, about 75 MM Btu/h, about 100 MM Btu/h, or about 125 MM Btu/h.

Butane gas 739 exits from the top of the debutanizer 735 and is cooled in the heat exchanger 722b by exchange with the stream 721a of buffer fluid. The heat exchanger 722b belongs to the second circuit 792 (FIG. 1A) of heat exchangers for use with the MED system 7000. The cooled butane gas 739 is collected in a reflux drum 740. A portion of the liquid butane from the reflux drum is returned to the debutanizer 735, and a portion of the liquid butane from the reflux drum 740 is either treated (for instance, in a MEROX unit) or sent to users as untreated product. The presence of the heat exchanger 722b recovers waste heat from the butane gas 739, enabling other components (for instance, cooling units or condensers) that would have been used to cool the butane gas 739 to be bypassed or eliminated from the debutanizer section.

In some examples, the butane gas 739 can be cooled. The stream 721a of buffer fluid can be heated to a temperature of between about 140° C. and about 160° C., such as about 140° F., about 150° F., or about 160° F. The thermal duty of the heat exchanger 722b can be between about 550 MM Btu/h and about 650 MM Btu/h, such as about 550 MM Btu/h, about 575 MM Btu/h, about 600 MM Btu/h, about 625 MM Btu/h, or about 650 MM Btu/h.

Figure 1G:
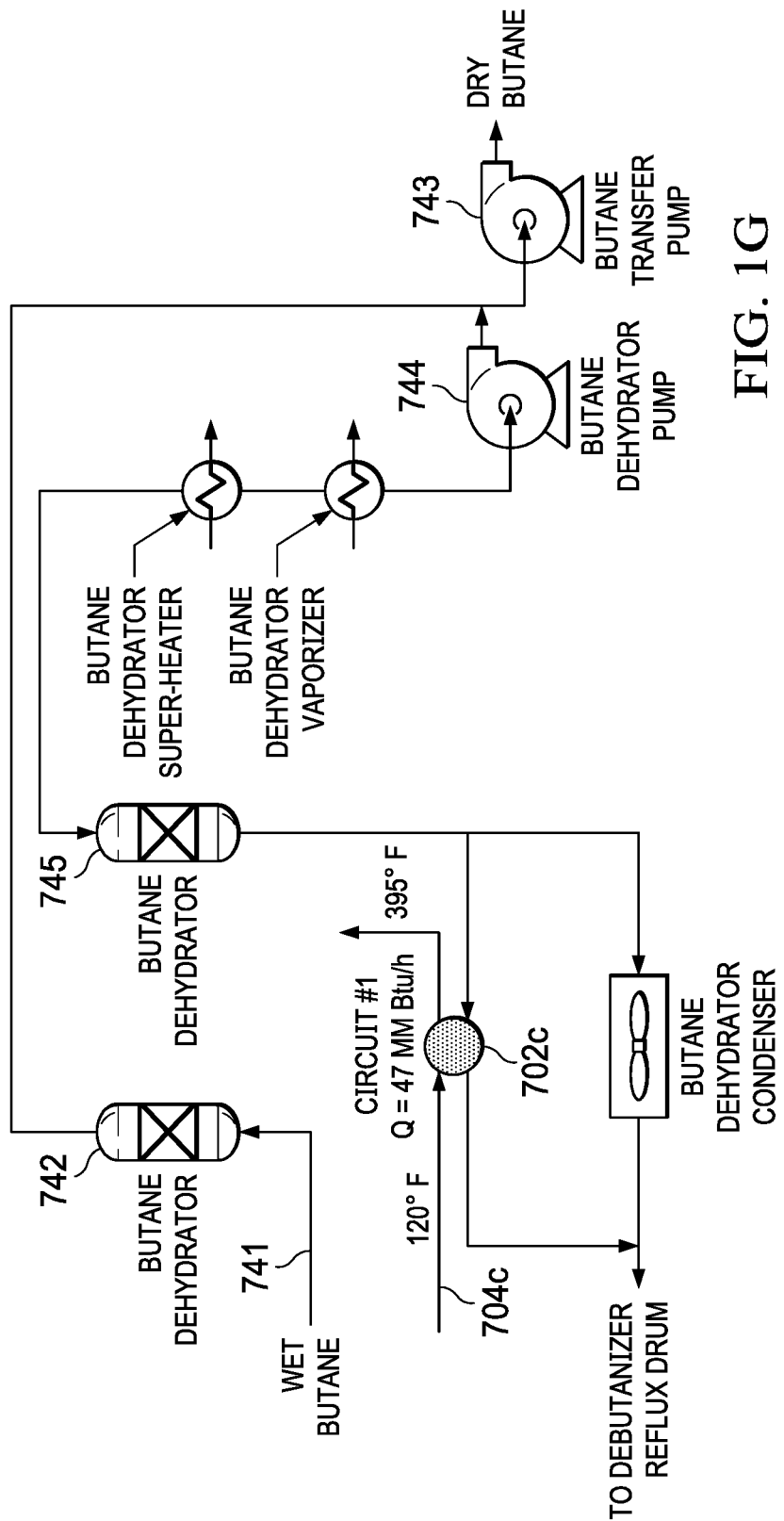
FIG. 1G is a diagram of a butane dehydrator section of a NGL fractionation plant.

Referring to FIG. 1G, in a butane dehydrator section, wet butane 741 is dehydrated in a dehydrator 742. The wet butane 741 can include, for instance, the butane gas 739 in the debutanizer section (FIG. 1F). A portion 743 of the dry butane from the dehydrator 742 is output as dry butane, for instance, to a butane refrigeration section (FIG. 1N). Another portion 744 of the butane from the dehydrator 742 is further dehydrated in a butane dehydrator 745. The dry butane 744 output from the butane dehydrator 742 is cooled in the heat exchanger 702c by exchange with the stream 704c of buffer fluid. The heat exchanger 702c belongs to the first circuit 790 (FIG. 1A) of heat exchangers. The cooled dry butane 744 is returned to the debutanizer reflux drum 740 (FIG. 1F). The presence of the heat exchanger 702c recovers waste heat from the dry butane 744, enabling other components (for instance, cooling units or condensers) that would have been used to cool the dry butane 744 to be bypassed or eliminated from the butane dehydrator section.

In some examples, the dry butane 744 can be cooled. The stream 704c of buffer fluid can be heated to a temperature of between about 390° F. and about 710° F., such as about 390° F., about 400° F., or about 410° F. The thermal duty of the heat exchanger 702c can be between about 25 MM Btu/h and about 125 MM Btu/h, such as about 25 MM Btu/h, about 50 MM Btu/h, about 75 MM Btu/h, about 100 MM Btu/h, or about 125 MM Btu/h.

Figure 1H:
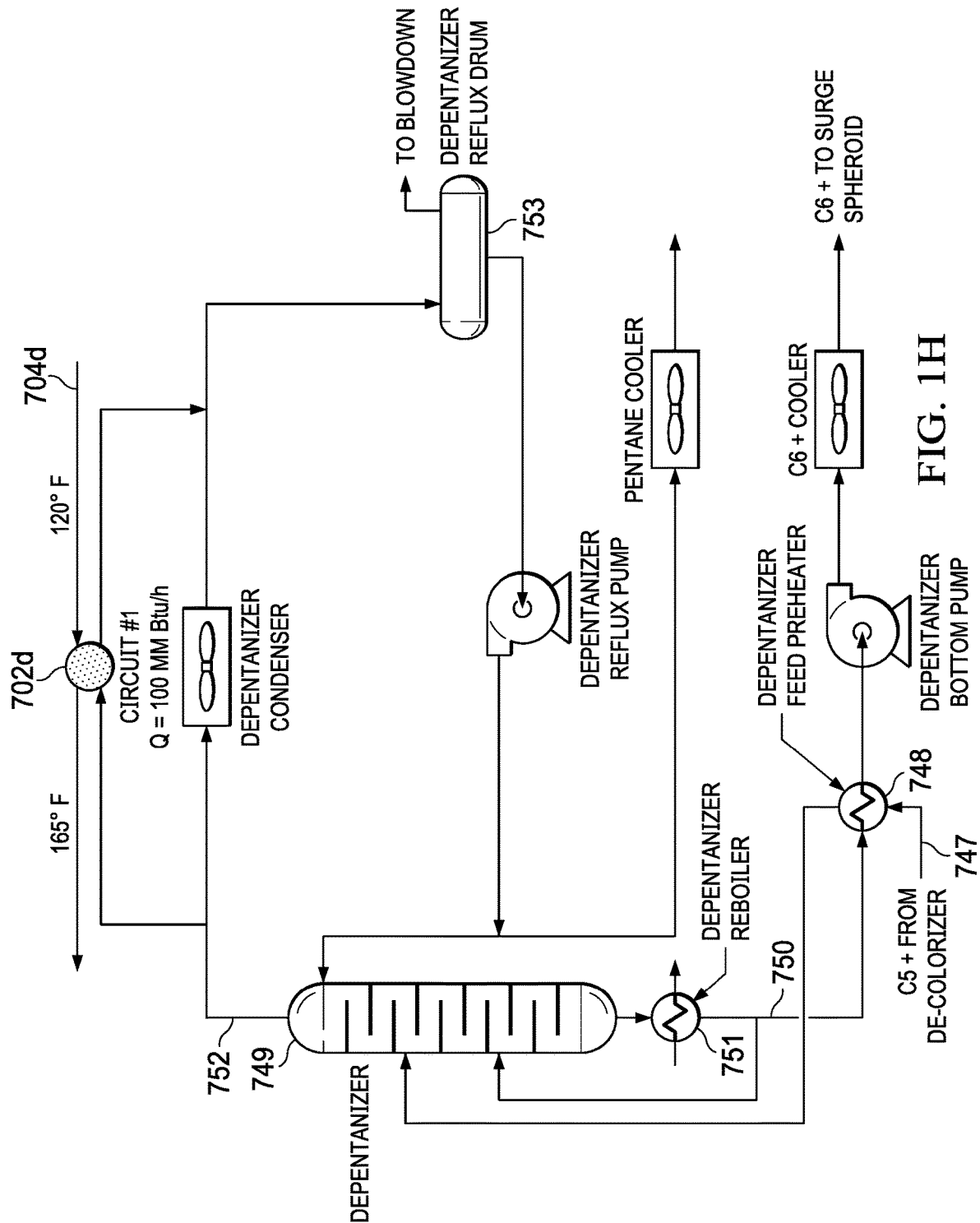
FIG. 1H is a diagram of a depentanizer section of a NGL fractionation plant.

Referring to FIG. 1H, in a depentanizer section of the natural gas liquid fractionation plant, a stream of C5+ NGL 747 received from a decolorizing section (FIG. 1J) is preheated in a heat exchanger 748 and provided into a depentanizer 749. A bottoms stream from the depentanizer 749 is processed in a reboiler 751. Vaporized pentane from the reboiler is returned to the depentanizer 749 and C6+ NGL bottoms 750 from the depentanizer 749 are used to heat the stream of C5+ NGL in 747 in the heat exchanger 748 and then output to storage, such as to a surge spheroid.

An overhead stream 752 of pentane gas from the depentanizer 749 is cooled in the heat exchanger 702d by exchange with the stream 704d of buffer fluid. The heat exchanger 702d belongs to the first circuit 790 (FIG. 1A) of heat exchangers. The cooled pentane 752 is collected in a reflux drum 753. A portion of the liquid pentane from the reflux drum 753 is returned to the depentanizer 749, and a portion of the liquid pentane from the reflux drum 753 is sent to storage, for instance, in a petrochemical plant. The presence of the heat exchanger 702d recovers waste heat from the pentane gas 752, and enables other components (for instance, cooling units or condensers) that would have been used to cool the pentane gas 752 to be bypassed or eliminated from the depentanizer section.

In some examples, the pentane gas 752 can be cooled. The stream 704d of buffer fluid can be heated to a temperature of between about 160° F. and about 180° F., such as about 160° F., about 170° F., or about 180° F. The thermal duty of the heat exchanger 702d can be between about 50 MM Btu/h and about 150 MM Btu/h, such as about 50 MM Btu/h, about 75 MM Btu/h, about 100 MM Btu/h, or about 125 MM Btu/h, or about 150 MM Btu/h.

Figure 1I:
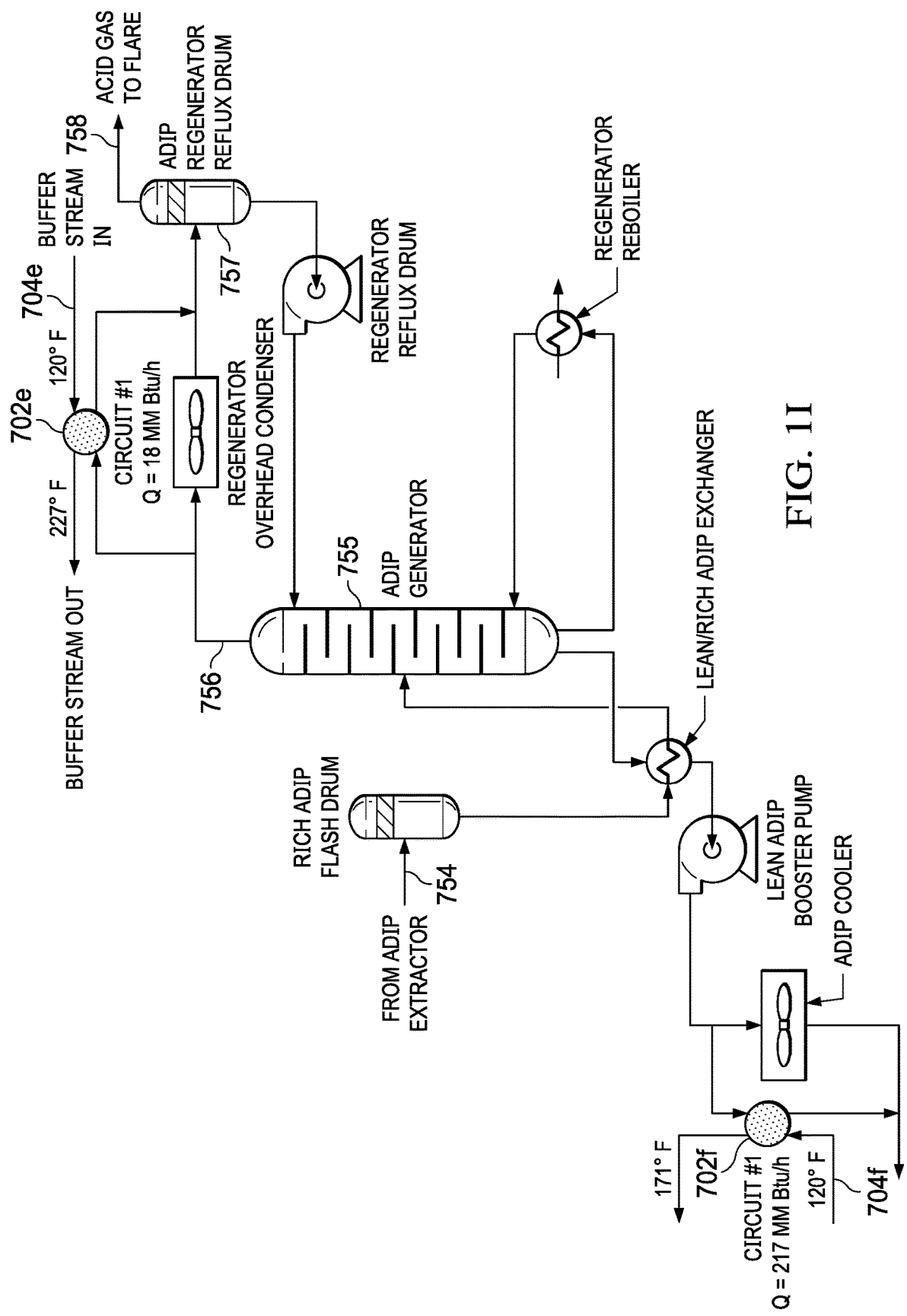
FIG. 1I is a diagram of a solvent regeneration section of a NGL fractionation plant.

Referring to FIG. 1I, in a solvent regeneration section, rich ADIP 754 from an ADIP extractor (not shown) is fed into an ADIP generator 755 to be regenerated into lean ADIP for reuse. Acid gases 756 leave the top of the ADIP generator 755 and are cooled in the heat exchanger 702e by exchange with the stream 704e of buffer fluid. The heat exchanger 702e belongs to the first circuit 790 (FIG. 1A) of heat exchangers. The cooled acid gases 756 are refluxed in a reflux drum 757. Acid gas 758 from the reflux drum 757 is sent to flare and any remaining ADIP is returned to the ADIP generator 755. The presence of the heat exchanger 702e recovers waste heat from the acid gases 756, enabling other components (for instance, cooling units or condensers) that would have been used to cool the acid gases 756 to be bypassed or eliminated from the solvent regeneration section.

In some examples, the acid gases 756 can be cooled. The stream 704e of buffer fluid can be heated to a temperature of between about 220° F. and about 240° F., such as about 220° F., about 230° F., or about 240° F. The thermal duty of the heat exchanger 702e can be between about 10 MM Btu/h and about 90 MM Btu/h, such as about 10 MM Btu/h, about 30 MM Btu/h, about 50 MM Btu/h, about 70 MM Btu/h, or about 90 MM Btu/h.

Lean ADIP 759 leaves the bottom of the ADIP generator 755 and is cooled in the heat exchanger 702*f* by exchange with the stream 704*f* of buffer fluid. The heat exchanger 702*f* belongs to the first circuit 790 (FIG. 1A) of heat exchangers. The cooled lean ADIP 759 is returned to the ADIP extractor. The presence of the heat exchanger 702*f* recovers waste heat from the lean ADIP 759, enabling other components (for instance, cooling units or condensers) that would have been used to cool the lean ADIP 759 to be bypassed or eliminated from the solvent regeneration section.

In some examples, the lean ADIP 759 can be cooled. The stream 704*f* of buffer fluid can be heated to a temperature of between about 160° F. and about 180° F., such as about 160° F., about 170° F., or about 180° F. The thermal duty of the heat exchanger 702*f* can be between about 150 MM Btu/h and about 250 MM Btu/h, such as about 150 MM Btu/h, about 175 MM Btu/h, about 200 MM Btu/h, about 225 MM Btu/h, or about 250 MM Btu/h.

Figure 1J:
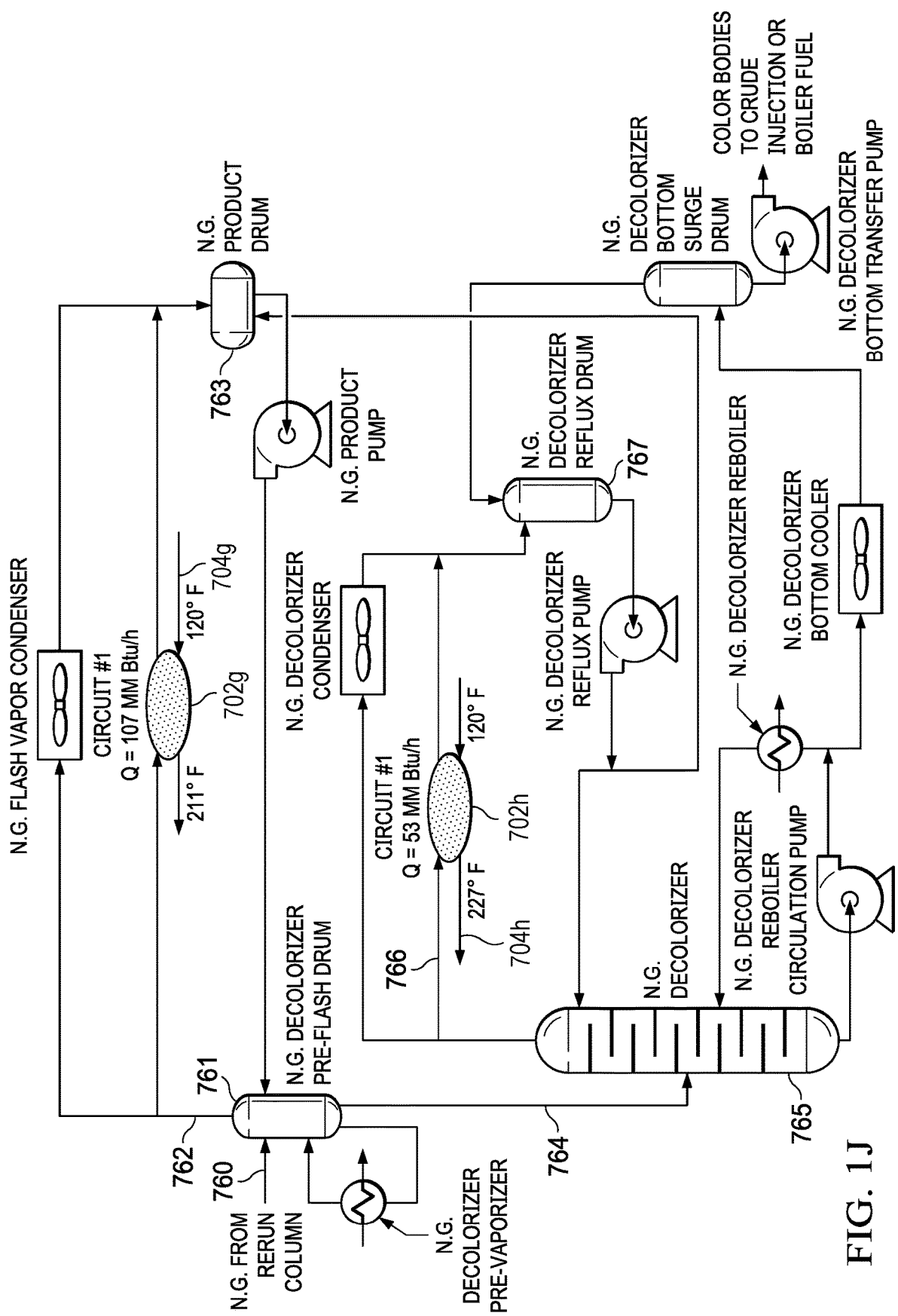
FIG. 1J is a diagram of a natural gasoline decolorizing section of a NGL fractionation plant.

Referring to FIG. 1J, in a decolorizing section of the natural gas liquid fractionation plant, NG 760 from the rerun unit is processed in a pre-flash drum 761. Light NG components 762 exit from the pre-flash drum 761 as overhead and are cooled in the heat exchanger 702*g* by exchange with the stream 704*g* of buffer fluid. The heat exchanger 702*g* belongs to the first circuit 790 (FIG. 1A) of heat exchangers. The cooled light NG components 762 are stored in a product drum 763. The presence of the heat exchanger 702*g* recovers waste heat from the light NG components 762, enabling other components (for instance, cooling units or condensers) that would have been used to cool the light NG components 762 to be bypassed or eliminated from the decolorizing section.

In some examples, the light NG components 762 can be cooled. The stream 704*g* of buffer fluid can be heated to a temperature of between about 200° C. and about 220° C., such as about 200° F., about 210° F., or about 220° F. The thermal duty of the heat exchanger 702*g* can be between about 50 MM Btu/h and about 150 MM Btu/h, such as about 50 MM Btu/h, about 75 MM Btu/h, about 100 MM Btu/h, about 125 MM Btu/h, or about 150 MM Btu/h.

Heavy NG components and color bodies exit from the pre-flash drum 761 as a bottoms stream 764 and are fed into a decolorizer 765. Color bodies leave the bottom of the decolorizer 765 and are pumped to a feed and surge unit to be injected into a crude line. NG leaves the decolorizer 765 as overhead NG gas 766, which is cooled in the heat exchanger 702*h* by exchange with the stream 704*h* of buffer fluid. The heat exchanger 702*h* belongs to the first circuit 790 (FIG. 1A) of heat exchangers. The cooled NG gas 766 is provided to a reflux drum 767. A portion of the liquid NG from the reflux drum 767 is stored in the product drum 763 and a portion is returned to the decolorizer 765. The presence of the heat exchanger 702*h* recovers waste heat from the NG gas 766, enabling other components (for instance, cooling units or condensers) that would have been used to cool the NG gas 766 to be bypassed or eliminated from the decolorizing section.

In some examples, the NG gas 766 can be cooled. The stream 704*h* of buffer fluid can be heated to a temperature of between about 220° C. and about 240° C., such as about 220° F., about 230° F., or about 240° F. The thermal duty of the heat exchanger 702*h* can be between about 25 MM Btu/h and about 125 MM Btu/h, such as about 25 MM Btu/h, about 50 MM Btu/h, about 75 MM Btu/h, about 100 MM Btu/h, or about 125 MM Btu/h.

Figure 1K:
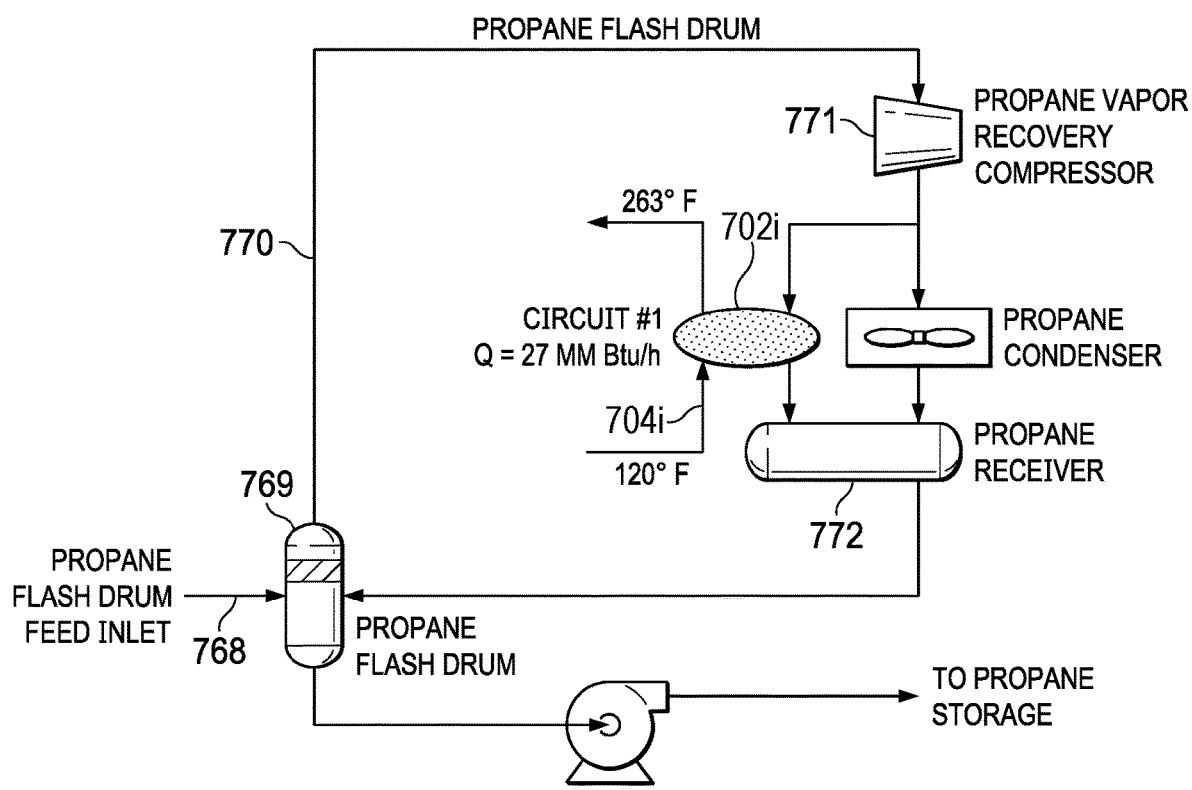
FIG. 1K is a diagram of a propane tank recovery section of a NGL fractionation plant.
Figure 1L:
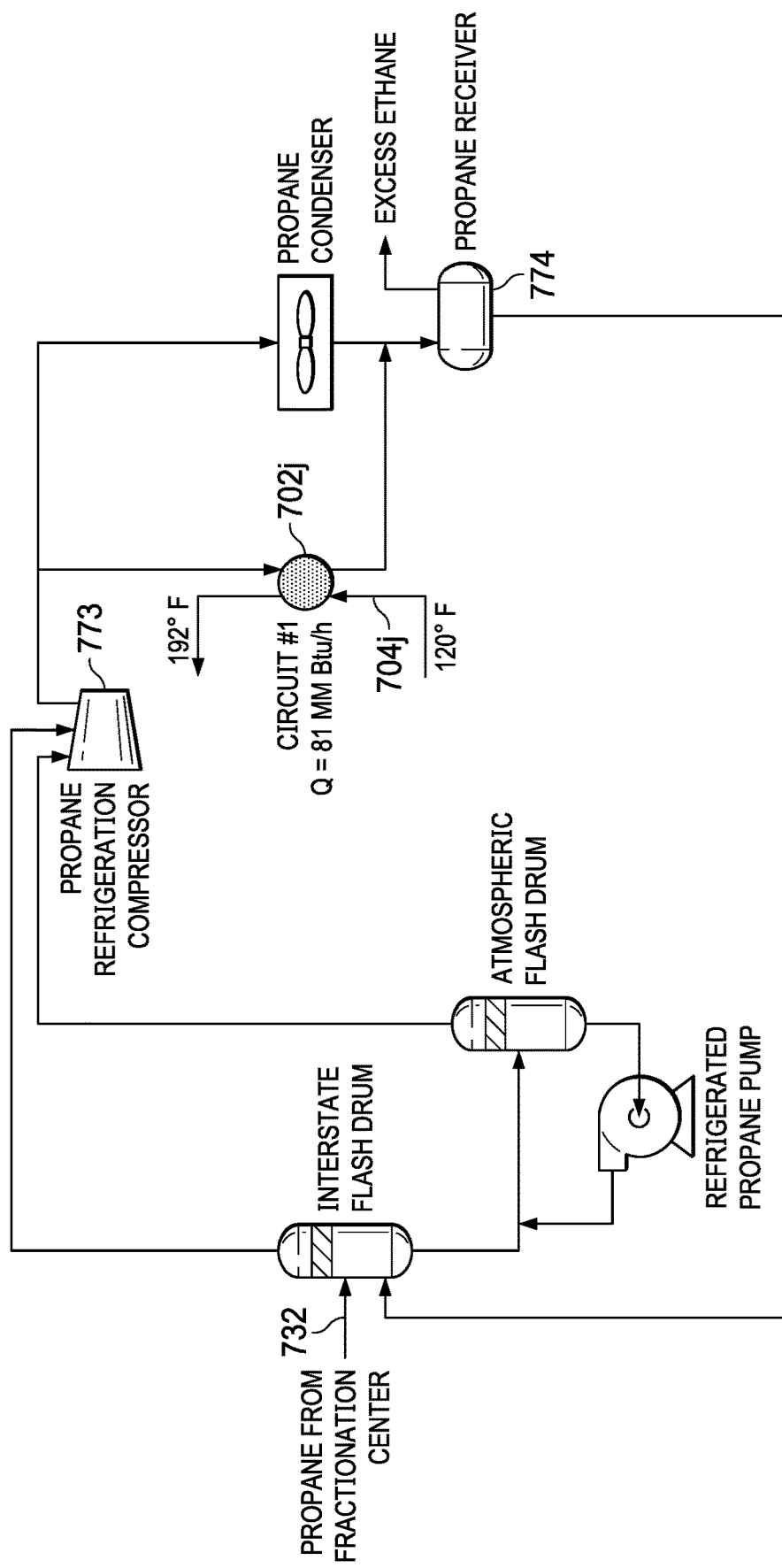
FIG. 1L is a diagram of a propane product refrigeration section of a NGL fractionation plant.

Referring to FIG. 1K, in a propane vapor recovery unit, propane 768 is received into a flash drum 769. A bottoms product of liquid propane is sent to propane storage. An overhead product 770 of propane vapor is compressed in a compressor 771 and cooled in the heat exchanger 702*i* by exchange with the stream 704*i* of buffer fluid. The heat exchanger 702*i* belongs to the first circuit 790 (FIG. 1A) of heat exchangers. The cooled propane 770 is stored in a product drum 772 and returned to the flash drum 769. The presence of the heat exchanger 702*i* recovers waste heat from the propane vapor 770, enabling other components (for instance, cooling units or condensers) that would have been used to cool the propane vapor 770 to be bypassed or eliminated from the vapor recovery unit.

In some examples, the propane vapor 770 can be cooled. The stream 704*i* of buffer fluid can be heated to a temperature of between about 250° C. and about 270° C., such as about 250° F., about 260° F., or about 270° F. The thermal duty of the heat exchanger 702*i* can be between about 10 MM Btu/h and about 90 MM Btu/h, such as about 10 MM Btu/h, about 30 MM Btu/h, about 50 MM Btu/h, about 70 MM Btu/h, or about 90 MM Btu/h.

Referring to FIG. 1L, in a propane refrigeration section, dry propane 732 from the propane dehydration section (FIG. 1E) is compressed in a compressor 773. The compressed dry propane 732 from the compressor 773 is cooled in the heat exchanger 702*j* by exchange with the stream 704*j* of buffer fluid. The heat exchanger 702*j* belongs to the first circuit 790 (FIG. 1A) of heat exchangers. The cooled dry propane 732 is stored in a propane receiver 774. The presence of the heat exchanger 702*j* recovers waste heat from the dry propane 732, enabling other components (for instance, cooling units or condensers) that would have been used to cool the dry propane 732 to be bypassed or eliminated from the propane refrigeration section.

In some examples, the dry propane 732 can be cooled from a temperature of between about 190° F. and about 210° F., such as about 190° F., about 200° F., about 210° F.; to a temperature of between about 130° F. and about 150° F., such as about 130° F., about 140° F., or about 150° F. The stream 704*j* of buffer fluid can be heated to a temperature of between about 190° C. and about 210° C., such as about 190° F., about 200° F., or about 210° F. The thermal duty of the heat exchanger 702*j* can be between about 50 MM Btu/h and about 150 MM Btu/h, such as about 50 MM Btu/h, about 75 MM Btu/h, about 100 MM Btu/h, about 125 MM Btu/h, or about 150 MM Btu/h.

Figure 1M:
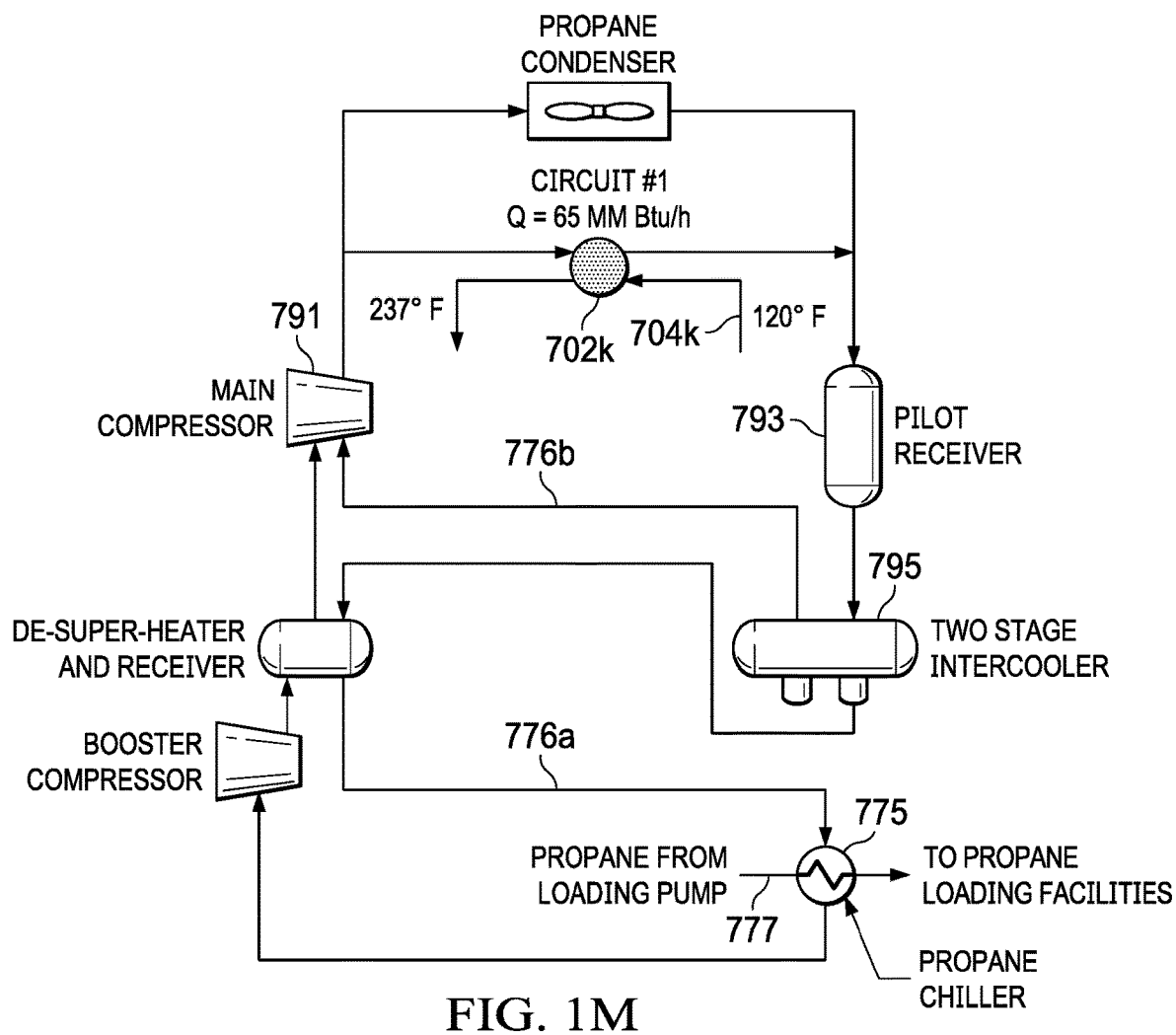
FIG. 1M is a diagram of a propane product sub-cooling section of a NGL fractionation plant.
Figure 1N:
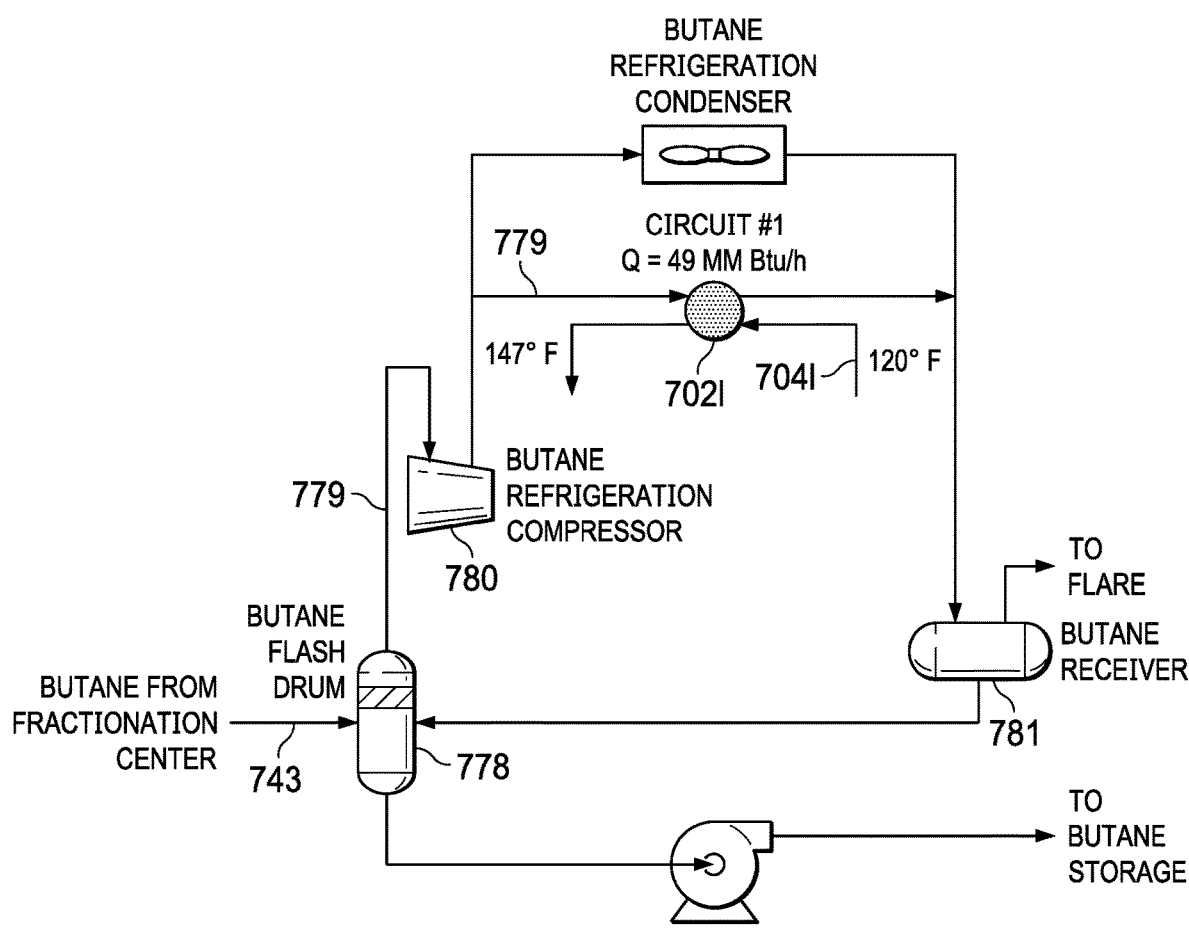
FIG. 1N is a diagram of a butane product refrigeration section of a NGL fractionation plant.

Referring to FIG. 1M, in some examples, propane product 777 can be sub-cooled in a propane product sub-cooling section by exchange in a propane chiller 775 with a cooling fluid 776. After cooling the propane product 777 in the propane chiller 775, the cooling fluid 776 is compressed in one or more compressors including a main compressor 791. The compressed cooling fluid 776 is cooled in the heat exchanger 702*k* by exchange with the stream 704*k* of buffer fluid. The heat exchanger 702*k* belongs to the first circuit 790 (FIG. 1A) of heat exchangers. The cooled cooling fluid 776 passes through a pilot receiver 793 and a two stage intercooler 795. A portion 776*a* of the cooling fluid exiting the two stage intercooler 795 is returned to the propane chiller 775 for further propane cooling, and a portion 776*b* of the cooling fluid exiting the two stage intercooler 795 returns to the main compressor 72 for compression. The presence of the heat exchanger 702*k* recovers waste heat from the cooling fluid 776, enabling other components (for instance, cooling units or condensers) that would have been used to cool the cooling fluid 776 to be bypassed or eliminated from the propane product sub-cooling section.

In some examples, the cooling fluid 776 can be cooled from a temperature of between about 230° F. and about 250° F., such as about 230° F., about 240° F., about 250° F.; to a temperature of between about 130° F. and about 150° F., such as about 130° F., about 140° F., or about 150° F. The stream 704k of buffer fluid can be heated to a temperature of between about 230° C. and about 250° C., such as about 230° F., about 240° F., or about 250° F. The thermal duty of the heat exchanger 702k can be between about 25 MM Btu/h and about 125 MM Btu/h, such as about 25 MM Btu/h, about 50 MM Btu/h, about 75 MM Btu/h, about 100 MM Btu/h, or about 125 MM Btu/h.

Referring to FIG. 1N, in a butane refrigeration section, dry butane 743 from the butane dehydration section (FIG. 1G) is flashed in a flash drum 778. Liquid butane is sent to a storage. Butane gas 779 is compressed in a compressor 780 and the compressed dry butane 779 is cooled in the heat exchanger 702l by exchange with the stream 704l of buffer fluid. The heat exchanger 702l belongs to the first circuit 790 (FIG. 1A) of heat exchangers. The cooled dry butane 779 is stored in a butane receiver 781. The presence of the heat exchanger 702l recovers waste heat from the dry butane 779, enabling other components (for instance, cooling units or condensers) that would have been used to cool the dry butane 779 to be bypassed or eliminated from the butane refrigeration section.

In some examples, the dry butane 779 can be cooled from a temperature of between about 140° F. and about 160° F., such as about 140° F., about 150° F., about 160° F.; to a temperature of between about 130° F. and about 150° F., such as about 130° F., about 140° F., or about 150° F. The stream 704l of buffer fluid can be heated to a temperature of between about 140° C. and about 160° C., such as about 140° F., about 150° F., or about 160° F. The thermal duty of the heat exchanger 702l can be between about 25 MM Btu/h and about 125 MM Btu/h, such as about 25 MM Btu/h, about 50 MM Btu/h, about 75 MM Btu/h, about 100 MM Btu/h, or about 125 MM Btu/h.

Figure 1O:
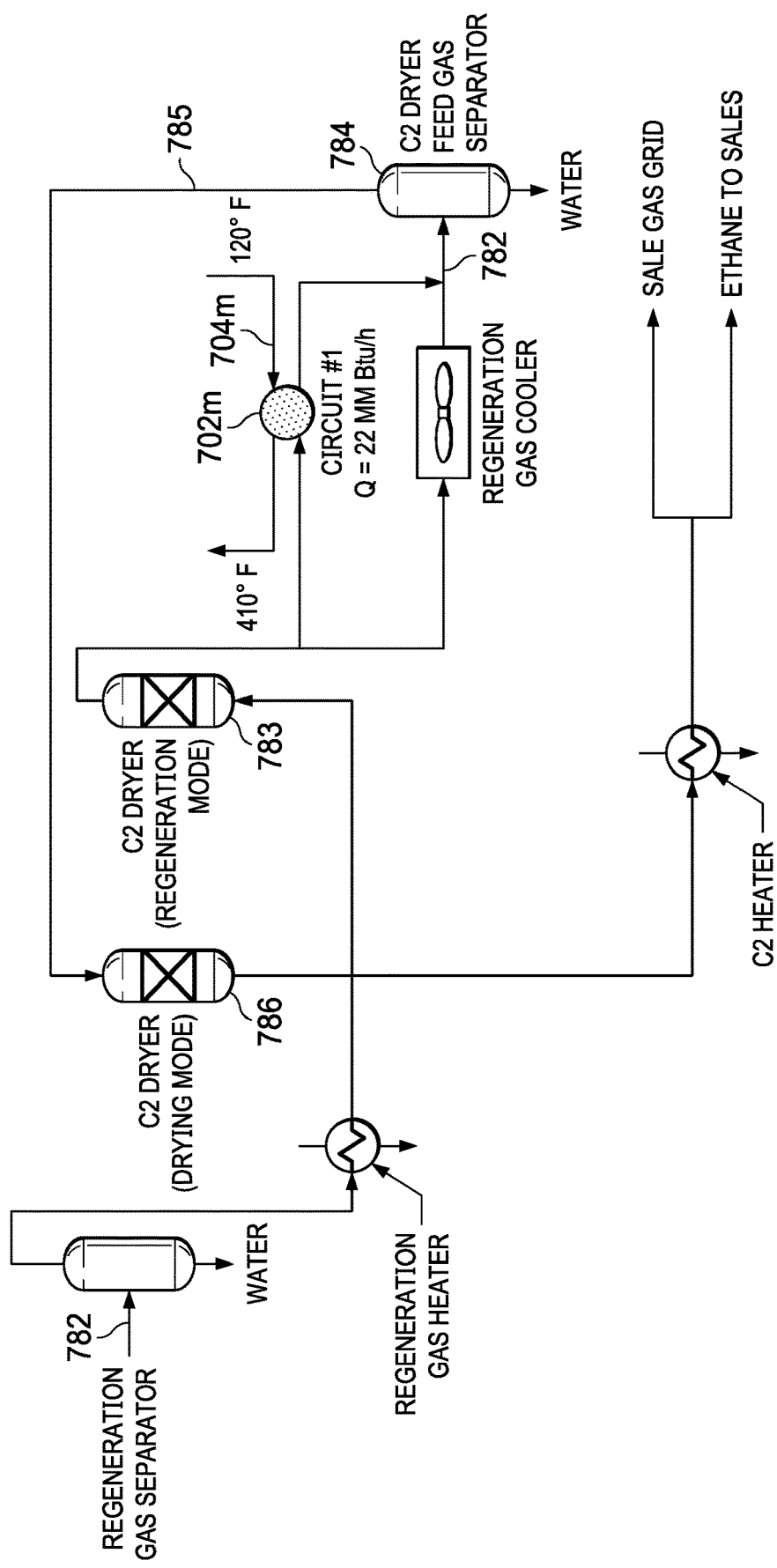
FIG. 1O is a diagram of an ethane production section of a NGL fractionation plant.
Figure 1P:
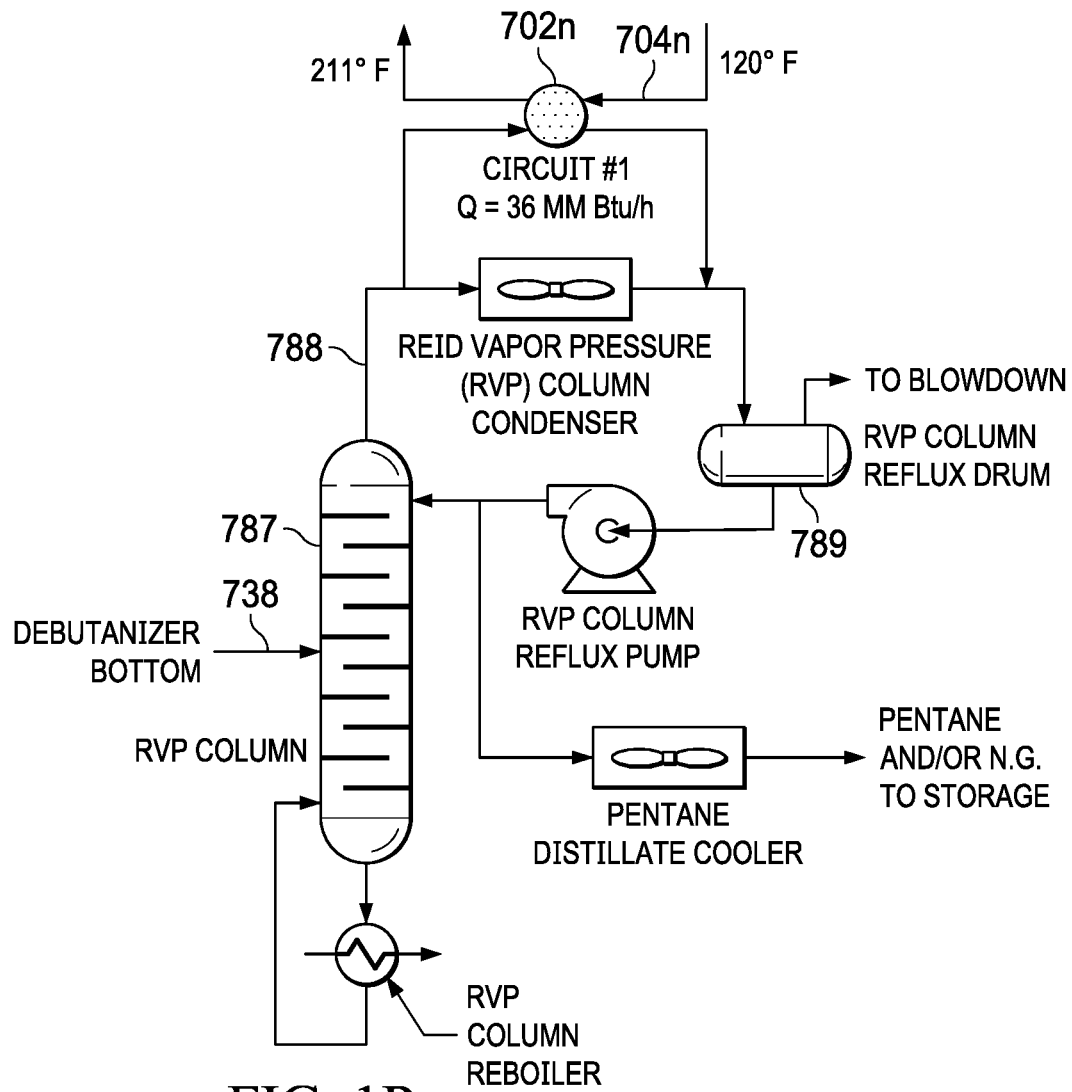
FIG. 1P is a diagram of a natural gasoline vapor section of a NGL fractionation plant.

Referring to FIG. 1O, in an ethane production section, ethane 782 is dried in a dryer 783 operating in a regeneration mode and cooled in the heat exchanger 702m by exchange with the stream 704m of buffer fluid. The heat exchanger 702m belongs to the first circuit 790 (FIG. 1A) of heat exchangers. The cooled ethane 782 is separated in a feed gas separator 784 and ethane vapor 785 is further dried in a dryer 786 operating in a drying mode. Water is removed. Dry ethane output from the dryer 786 is heated and send to a sales gas grid or elsewhere. The presence of the heat exchanger 702m recovers waste heat from the ethane 782, enabling other components (for instance, cooling units or condensers) that would have been used to cool the ethane 782 to be bypassed or eliminated from the ethane production section.

In some examples, the ethane 782 can be cooled from a temperature of between about 410° F. and about 430° F., such as about 410° F., about 420° F., or about 430° F.; to a temperature of between about 120° F. and about 140° F., such as about 120° F., about 130° F., or about 140° F. The stream 704m of buffer fluid can be heated to a temperature of between about 400° C. and about 420° C., such as about 400° F., about 410° F., or about 420° F. The thermal duty of the heat exchanger 702m can be between about 10 MM Btu/h and about 90 MM Btu/h, such as about 10 MM Btu/h, about 30 MM Btu/h, about 50 MM Btu/h, about 70 MM Btu/h, or about 90 MM Btu/h.

Referring to FIG. 1P, in an NG vapor pressure control section, debutanizer bottoms 738 from the debutanizer 735 (FIG. 1F) are received into an RVP column 787. An overhead stream of pentane 788 leaves the RVP column 787 and is cooled in the heat exchanger 702n by exchange with the stream 704n of buffer fluid. The heat exchanger 702n belongs to the first circuit 790 (FIG. 1A) of heat exchangers. The cooled pentane 788 is provided to a reflux drum 789. A portion of the liquid pentane from the reflux drum 789 is returned to the RVP column 787 and a portion is sent to storage. The presence of the heat exchanger 702q recovers waste heat from the pentane 788, enabling other components (for instance, cooling units or condensers) that would have been used to cool the pentane 788 to be 702n or eliminated from the NG vapor pressure control section.

In some examples, the pentane 788 can be cooled from a temperature of between about 210° F. and about 230° F., such as about 210° F., about 220° F., or about 230° F.; to a temperature of between about 200° F. and about 220° F., such as about 200° F., about 210° F., or about 220° F. The stream 704n of buffer fluid can be heated to a temperature of between about 200° C. and about 220° C., such as about 200° F., about 210° F., or about 220° F. The thermal duty of the heat exchanger 702n can be between about 10 MM Btu/h and about 90 MM Btu/h, such as about 10 MM Btu/h, about 30 MM Btu/h, about 50 MM Btu/h, about 70 MM Btu/h, or about 90 MM Btu/h.

The systems described here can enable low-grade waste heat from the NGL fractionation plant to be used for carbon-free generation of cooling capacity, enabling the NGL fractionation plant to be more energy efficient, less polluting, or both. In addition, the systems can be used for carbon-free desalination of water.

The network of heat exchangers described here can be integrated into an existing NGL fractionation plant as a retrofit or can be integrated into a newly constructed NGL fractionation plant. A retrofit to an existing NGL fractionation plant allows the efficiency, and fuel savings offered by the energy conversion systems described here to be accessible with a relatively low-capital investment. The energy conversion systems can make use of existing structure in an NGL fractionation plant while still enabling efficient waste heat recovery and conversion of waste heat to cooling capacity and desalination capabilities. The integration of an energy conversion system into an existing NGL fractionation plant can be generalizable to plant-specific operating modes.

Thus, particular implementations of the subject matter have been described. Other implementations are within the scope of the following claims.

The invention claimed is:

1. A system comprising:
    a waste heat recovery heat exchanger network thermally coupled to a natural gas liquid (NGL) fractionation plant, the waste heat recovery heat exchanger network comprising:
        a first waste heat recovery heat exchanger configured to heat a first buffer fluid stream by exchange with an output fluid stream from a depropanizer distillation column of the NGL fractionation plant; and
        a second waste heat recovery heat exchanger configured to heat the first buffer fluid stream by exchange with an output fluid stream from a debutanizer distillation column of the NGL fractionation plant; and
    a water desalination system comprising a first train of one or more desalination heat exchangers configured to heat saline by exchange with the heated first buffer fluid stream to generate fresh water and brine.

2. The system of claim 1, wherein the water desalination system is configured to generate between 50,000 m³/day and 70,000 m³/day of fresh water.

3. The system of claim 1, wherein the first train of the water desalination system comprises:
   a first desalination heat exchanger configured to heat saline by exchange with the heated first buffer fluid stream to generate water vapor and brine; and
   a second desalination heat exchanger configured to heat saline by exchange with the water vapor from the first desalination heat exchanger to generate water vapor and brine, wherein the water vapor from the first desalination heat exchanger is condensed into fresh water in the second desalination heat exchanger.

4. The system of claim 1, wherein the water desalination system comprises a second train of one or more desalination heat exchangers configured to heat saline by exchange with a combined buffer fluid stream to generate fresh water and brine,
   wherein the combined buffer fluid stream includes the first buffer fluid stream from the first train and a heated second buffer fluid stream heated by exchange with heat from the natural gas liquid fractionation plant.

5. The system of claim 4, wherein the water desalination system comprises a third train of one or more desalination heat exchangers configured to heat saline by exchange with the combined buffer fluid stream from the second train.

6. The system of claim 1, wherein the first waste heat recovery heat exchanger is configured to heat the first buffer fluid stream by exchange with propane gas output from the depropanizer distillation column in the natural gas liquid fractionation plant.

7. The system of claim 1, wherein the second waste heat recovery heat exchanger is configured to heat the first buffer fluid stream by exchange with butane gas output from the debutanizer distillation column in the natural gas liquid fractionation plant.

8. The system of claim 1, comprising
   a Kalina cycle energy conversion system including:
   one or more first energy conversion heat exchangers configured to heat a working fluid by exchange with a heated second buffer fluid stream;
   a separator configured to receive the heated working fluid and to output a vapor stream of the working fluid and a liquid stream of the working fluid; and
   a cooling subsystem including a first cooling element configured to condense the vapor stream of the working fluid and a second cooling element configured to cool a process fluid stream from the natural gas liquid fractionation plant by exchange with the condensed vapor stream of the working fluid.

9. The system of claim 8, wherein the second cooling element is configured to cool ethane gas output from a deethanizer in the natural gas liquid fractionation plant.

10. The system of claim 8, wherein the second cooling element comprises a chiller having a thermal duty of between 300 MM Btu/h and 500 MM Btu/h.

11. The system of claim 8, wherein the first cooling element comprises a valve.

12. The system of claim 8, wherein the energy conversion system comprises a pump configured to pump the working fluid to a pressure of between 11 Bar and 12 Bar.

13. The system of claim 8, wherein the one or more first energy conversion heat exchangers comprise:
   an energy conversion heat exchanger having a thermal duty of between 100 MM Btu/h and 200 MM Btu/h; and
   an energy conversion heat exchanger having a thermal duty of between 400 MM Btu/h and about 500 MM Btu/h.

14. The system of claim 8, wherein the one or more first energy conversion heat exchangers are configured to heat a first portion of the working fluid, and wherein the Kalina cycle energy conversion system comprises one or more second energy conversion heat exchangers configured to heat a second portion of the working fluid by exchange with the liquid stream of the working fluid.

15. The system of claim 14, wherein the separator is configured to receive the heated first and second portions of the working fluid.

16. The system of claim 14, wherein the one or more second energy conversion heat exchangers are configured to heat the second portion of the working fluid by exchange with the heated second buffer fluid stream.

17. The system of claim 8, comprising a turbine configured to generate power from the liquid stream of the working fluid.

18. The system of claim 8, comprising a storage tank,
   wherein the first buffer fluid stream flows from the storage tank, through the waste heat recovery heat exchanger network, through the water desalination system, and back to the storage tank, and
   wherein the second buffer fluid stream flows from the storage tank, through the a third waste heat recovery heat exchanger, through the Kalina cycle energy conversion system, and back to the storage tank.

19. The system of claim 8, comprising a third waste heat recovery heat exchanger configured to heat the second buffer fluid stream by exchange with propane gas output from a propane dehydrator in the natural gas liquid fractionation plant.

20. The system of claim 8, comprising a third waste heat recovery heat exchanger is configured to heat the second buffer fluid stream by exchange with a C5+ bottoms product from the debutanizer distillation column in the natural gas liquid fractionation plant.

21. The system of claim 8, comprising a third waste heat recovery heat exchanger is configured to heat the second buffer fluid stream by exchange with butane gas output from a butane dehydrator in the natural gas liquid fractionation plant.

22. The system of claim 8, comprising a third waste heat recovery heat exchanger is configured to heat the second buffer fluid stream by exchange with pentane gas output from a depentanizer in the natural gas liquid fractionation plant.

23. The system of claim 8, comprising a third waste heat recovery exchanger is configured to heat the second buffer fluid stream by exchange with acid gases output from an ADIP generator in the natural gas liquid fractionation plant.

24. The system of claim 8, comprising a third waste heat recovery exchanger is configured to heat the second buffer fluid stream by exchange with lean ADIP output from an ADIP generator in the natural gas liquid fractionation plant.

25. The system of claim 8, comprising a third waste heat recovery exchanger is configured to heat the second buffer fluid stream by exchange with light NG components output from a pre-flash drum in a decolorizing section of the natural gas liquid fractionation plant.

26. The system of claim 8, comprising a third waste heat recovery exchanger is configured to heat the second buffer fluid stream by exchange with NG gas output from a decolorizer in the natural gas liquid fractionation plant.

27. The system of claim 8, comprising a third waste heat recovery exchanger is configured to heat the second buffer fluid stream by exchange with compressed propane in the natural gas liquid fractionation plant.

28. The system of claim 8, comprising a third waste heat recovery exchanger is configured to heat the second buffer fluid stream by exchange with dry ethane gas in the natural gas liquid fractionation plant.

29. The system of claim 8, comprising a third waste heat recovery exchanger is configured to heat the second buffer fluid stream by exchange with pentane gas output from an RVP column in the natural gas liquid fractionation plant.

30. A method comprising:
heating a first buffer fluid stream via a first waste heat recovery heat exchanger by exchange with an output fluid stream from a depropanizer distillation column of a natural gas liquid (NGL) fractionation plant;
heating the first buffer fluid stream via a second waste heat recovery heat exchanger by exchange with an output fluid stream from a debutanizer distillation column of the NGL fractionation plant; and
generating fresh water in a first train of a water desalination system, including heating saline in one or more desalination heat exchangers of the first train by exchange with the heated first buffer fluid stream to generate fresh water and brine.

31. The method of claim 30, comprising generating between 50,000 m³/day and 70,000 m³/day of fresh water.

32. The method of claim 30, comprising:
heating saline in a first desalination heat exchanger of the first train by exchange with the heated first buffer fluid stream to generate water vapor and brine;
heating saline in a second desalination heat exchanger of the first train by exchange with the water vapor from the first desalination heat exchanger to generate water vapor and brine; and
condensing the water vapor from the first desalination heat exchanger into fresh water in the second desalination heat exchanger.

33. The method of claim 30, wherein heating saline in the one or more desalination heat exchangers of the first train includes cooling the first buffer fluid stream from a temperature of between 60° C. and 70° C. to a temperature of between 55° C. and 65° C.

34. The method of claim 30, comprising generating fresh water in a second train of the water desalination system, including heating saline in one or more desalination heat exchangers of the second train by exchange with a combined buffer fluid stream to generate fresh water and brine,
wherein the combined buffer fluid stream includes the first buffer fluid stream from the first train and a heated second buffer fluid stream heated by exchange with heat from the natural gas liquid fractionation plant.

35. The system of claim 34, wherein heating saline in the one or more desalination heat exchangers of the second train includes cooling the combined buffer fluid stream from a temperature of between 55° C. and 65° C. to a temperature of between 50° C. and 60 ° C.

36. The system of claim 34, comprising generating fresh water in a third train of the water desalination system, including heating saline in one or more desalination heat exchangers of the third train by exchange with the combined buffer fluid stream from the second train.

37. The system of claim 36, wherein heating saline in the one or more desalination heat exchangers of the third train includes cooling the combined buffer fluid stream from a temperature of between 50° C. and 60° C. to a temperature of between 45° C. and 55° C.

38. The method of claim 30, wherein heating the first buffer fluid stream comprises heating the first buffer fluid stream by exchange with propane gas output from the depropanizer distillation column in the natural gas liquid fractionation plant.

39. The method of claim 30, wherein heating the first buffer fluid stream comprises heating the buffer fluid stream by exchange with butane gas output from the debutanizer distillation column in the natural gas liquid fractionation plant.

40. The method of claim 30, comprising:
generating power in a Kalina cycle energy conversion system, comprising:
heating a working fluid via one or more first energy conversion heat exchangers by exchange with a heated second buffer fluid stream;
separating, in a separator, the heated working fluid into a vapor stream of the working fluid and the liquid stream of the working fluid;
condensing the vapor stream of the working fluid; and
cooling a process fluid stream in the natural gas liquid fractionation plant by exchange with the condensed vapor stream of the working fluid.

41. The method of claim 40, wherein cooling the process fluid stream comprises producing at least 350 MM Btu/h of cooling capacity for the natural gas liquid fractionation plant.

42. The method of claim 40, wherein cooling the process fluid stream comprises cooling ethane gas output from a deethanizer in the natural gas liquid fractionation plant.

43. The method of claim 40, comprising pumping the working fluid to a pressure of between 11 Bar and 12 Bar.

44. The method of claim 40, wherein heating the working fluid comprises heating the working fluid to a temperature of between 160° F. and 180° F.

45. The method of claim 40, wherein heating the working fluid comprises heating a first portion of the working fluid by exchange with the heated second buffer fluid stream, and comprising heating a second portion of the working fluid via one or more second energy conversion heat exchangers by exchange with the liquid stream of the working fluid.

46. The method of claim 40, comprising generating power from the liquid stream of the working fluid by a second turbine.

47. The method of claim 40, comprising:
flowing the second buffer fluid stream from a storage tank, through a third waste heat recovery exchanger, through the Kalina cycle energy conversion system, and back to the storage tank; and
flowing the first buffer fluid stream from the storage tank, through the first and second waste heat recovery exchangers, through the water desalination system, and back to the storage tank.

48. The method of claim 40, comprising heating the second buffer fluid stream via a third waste heat recovery heat exchanger by exchange with propane gas output from a propane dehydrator in the natural gas liquid fractionation plant.

49. The method of claim 40, comprising heating the second buffer fluid stream via a third waste heat recovery heat exchanger by exchange with a C5+ bottoms product from the debutanizer distillation column in the natural gas liquid fractionation plant.

50. The method of claim 40, comprising heating the second buffer fluid stream via a third waste heat recovery heat exchanger by exchange with butane gas output from the debutanizer distillation column in the natural gas liquid fractionation plant.

51. The method of claim 40, comprising heating the second buffer fluid stream via a third waste heat recovery heat exchanger by exchange with butane gas output from a butane dehydrator in the natural gas liquid fractionation plant.

52. The method of claim 40, comprising heating the second buffer fluid stream via a third waste heat recovery heat exchanger by exchange with pentane gas output from a depentanizer in the natural gas liquid fractionation plant.

53. The method of claim 40, comprising heating the second buffer fluid stream via a third waste heat recovery heat exchanger by exchange with acid gases output from an ADIP generator in the natural gas liquid fractionation plant.

54. The method of claim 40, comprising comprises heating the second buffer fluid stream via a third waste heat recovery heat exchanger by exchange with lean ADIP output from an ADIP generator in the natural gas liquid fractionation plant.

55. The method of claim 40, comprising heating the second buffer fluid stream via a third waste heat recovery heat exchanger by exchange with light NG components output from a pre-flash drum in a decolorizing section of the natural gas liquid fractionation plant.

56. The method of claim 40, comprising heating the second buffer fluid stream via a third waste heat recovery heat exchanger by exchange with NG gas output from a decolorizer in the natural gas liquid fractionation plant.

57. The method of claim 40, comprising heating the second buffer fluid stream via a third waste heat recovery heat exchanger by exchange with compressed propane in the natural gas liquid fractionation plant.

58. The method of claim 40, comprising heating the second buffer fluid stream via a third waste heat recovery heat exchanger by exchange with dry ethane gas in the natural gas liquid fractionation plant.

59. The method of claim 40, comprising heating the second buffer fluid stream via a third waste heat recovery heat exchanger by exchange with pentane gas output from an RVP column in the natural gas liquid fractionation plant.

* * * * *

UNITED STATES PATENT AND TRADEMARK OFFICE
CERTIFICATE OF CORRECTION

PATENT NO. : 10,663,234 B2  
APPLICATION NO. : 15/842522  
DATED : May 26, 2020  
INVENTOR(S) : Mahmoud Bahy Mahmoud Noureldin and Akram Hamed Mohamed Kamel Page 1 of 1

It is certified that error appears in the above-identified patent and that said Letters Patent is hereby corrected as shown below:

Column 30, Line 28, Claim 18 delete "the a" and insert -- a --, therefor.

Column 31, Line 59, Claim 35 delete "60 ° C." and insert -- 60° C. --, therefor.

Signed and Sealed this  
Eleventh Day of August, 2020

Andrei Iancu  
*Director of the United States Patent and Trademark Office*